US012487510B2

United States Patent
Zhu et al.

(10) Patent No.: US 12,487,510 B2
(45) Date of Patent: Dec. 2, 2025

(54) REFLECTIVE MODULE, REFLECTIVE DRIVING ASSEMBLY, AND CAMERA MODULE

(71) Applicant: NINGBO SUNNY OPOTECH CO., LTD., Zhejiang (CN)

(72) Inventors: Junlong Zhu, Zhejiang (CN); Hiroshi Osada, Zhejiang (CN); Zhiqiang Xu, Zhejiang (CN); Xuepeng Fu, Zhejiang (CN); Chengchang Zheng, Zhejiang (CN); Haitao Wang, Zhejiang (CN); Jin Wu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 18/715,428

(22) PCT Filed: Apr. 18, 2024

(86) PCT No.: PCT/CN2024/088574
§ 371 (c)(1),
(2) Date: Oct. 21, 2024

(65) Prior Publication Data
US 2025/0264784 A1    Aug. 21, 2025

(30) Foreign Application Priority Data

Feb. 19, 2024   (CN) .......................... 202410185792.8
Mar. 12, 2024   (CN) .......................... 202410278978.8

(51) Int. Cl.
*G03B 17/17* (2021.01)
*G03B 5/00* (2021.01)

(52) U.S. Cl.
CPC .............. *G03B 17/17* (2013.01); *G03B 5/00* (2013.01); *G03B 2205/0069* (2013.01)

(58) Field of Classification Search
CPC ... G03B 17/17; G03B 5/00; G03B 2205/0069
See application file for complete search history.

(56) References Cited

U.S. PATENT DOCUMENTS

| 10,481,410 B2 | 11/2019 | Kim et al. |
| 12,273,608 B2 | 4/2025 | Kwon et al. |

(Continued)

FOREIGN PATENT DOCUMENTS

| CN | 1763622 | 4/2006 |
| CN | 106777783 | 5/2017 |

(Continued)

OTHER PUBLICATIONS

Office Action issued Mar. 28, 2024 in corresponding Chinese Patent Application No. 202410185792.8, with English-language translation.

*Primary Examiner* — Stephanie E Bloss
*Assistant Examiner* — Diana Hancock
(74) *Attorney, Agent, or Firm* — WENDEROTH, LIND & PONACK, L.L.P.

(57) ABSTRACT

This application discloses a reflective module and a camera module. Particularly, the reflective module comprises: a reflective element and a reflection driving assembly; wherein the reflective element reflects the light rays propagating in a direction of a first axis to a direction of a second axis intersecting with the first axis at a certain angle, and the reflection driving assembly comprises a reflection base, a frame supporting the reflective element and capable of rotating around the first axis, and a shaft support member and at least two auxiliary balls which are provided between the reflection base and the frame. Particularly, the shaft support member is passed through by the first axis and fixed to the reflection base or frame; and the at least two auxiliary balls are provided between at least two auxiliary upper grooves of the frame and at least two auxiliary lower (Continued)

grooves of the reflection base, wherein one of the at least two auxiliary upper grooves and at least two auxiliary lower grooves are straight-line grooves extending along a tangent direction of a virtual circle centered on the first axis.

13 Claims, 16 Drawing Sheets

(56) References Cited

U.S. PATENT DOCUMENTS

| | | |
|---|---|---|
| 2006/0082674 A1 | 4/2006 | Noji |
| 2017/0242225 A1 | 8/2017 | Fiske |
| 2021/0067667 A1* | 3/2021 | Yang .................... G02B 27/646 |
| 2021/0405333 A1* | 12/2021 | Lee .......................... G02B 7/18 |
| 2022/0239835 A1 | 7/2022 | Chang et al. |
| 2023/0251502 A1 | 8/2023 | Kwon et al. |
| 2023/0350160 A1 | 11/2023 | Hong |
| 2024/0085720 A1* | 3/2024 | Kwon ...................... G03B 5/00 |
| 2024/0231194 A1* | 7/2024 | Lee ........................ G03B 17/17 |

FOREIGN PATENT DOCUMENTS

| | | |
|---|---|---|
| CN | 108427235 | 8/2018 |
| CN | 108572430 | 9/2018 |
| CN | 212410942 | 1/2021 |
| CN | 112532816 | 3/2021 |
| CN | 213843634 | 7/2021 |
| CN | 113970868 | 1/2022 |
| CN | 114153107 | 3/2022 |
| CN | 115047694 | 9/2022 |
| CN | 115438434 | 12/2022 |
| CN | 115696003 | 2/2023 |
| CN | 116482914 | 7/2023 |
| CN | 116567393 | 8/2023 |
| CN | 116661215 | 8/2023 |
| CN | 116661216 | 8/2023 |
| CN | 219936186 | 10/2023 |
| CN | 117741899 | 3/2024 |
| DE | 35 34 455 | 4/1987 |
| EP | 3 816 691 | 5/2021 |
| WO | 2011/099111 | 8/2011 |
| WO | 2019/207464 | 10/2019 |
| WO | 2021/092855 | 5/2021 |
| WO | 2021/253519 | 12/2021 |

\* cited by examiner

REFLECTIVE MODULE, REFLECTIVE DRIVING ASSEMBLY, AND CAMERA MODULE

TECHNICAL FIELD

The present application relates to the field of camera technology, particularly to a reflective module and a camera module.

BACKGROUND ART

With the popularization of mobile electronic devices, the related technology of camera modules for helping users obtain images has undergone rapid development and progress. In the current market, there is an increasing demand from consumers for remote shooting of camera modules configured on mobile electronic devices.

A camera module with telephoto imaging function needs to have a longer focal length to obtain clear images of the subject at a longer distance. However, having a longer focal length means that the camera module has a longer length size. Therefore, at least one reflective module reflecting light may be provided in the camera module to fold the optical path of the camera module, thereby avoiding the size of the camera module being too long. A reflective driving assembly can be correspondingly provided in the reflective module to adjust the optical path of the camera module, thereby further improving the imaging function of the camera module.

Correspondingly, this application provides a reflective module and a camera module with the reflective module.

SUMMARY OF THE APPLICATION

One object of this application is to provide a reflective module and a camera module, which overcomes the shortcomings of the prior art, optimizes the structure of the reflective module, and improves the imaging quality of the camera module with the reflective module.

One object of this application is to provide a reflection driving assembly and a camera module, which overcomes the shortcomings of the prior art, optimizes the structure of the reflection driving assembly, and improves the imaging quality of the camera module with the reflection driving assembly.

According to one aspect of the present application, there provides a reflective module, which comprises:
  a reflective element, which reflects the light rays propagating in the direction of a first axis to the direction of a second axis intersecting with the first axis at a certain angle; and
  a reflection driving assembly, which comprises: a reflection base, a frame supporting the reflective element and capable of rotating around the first axis, and a shaft support member and at least two auxiliary balls which are provided between the reflection base and the frame; wherein the shaft support member is passed through by the first axis and fixed to the reflection base or the frame; and the at least two auxiliary balls are provided between at least two auxiliary upper grooves of the frame and at least two auxiliary lower grooves of the reflection base, and one of the at least two auxiliary upper grooves and the at least two auxiliary lower grooves are straight-line grooves extending along the tangent direction of a virtual circle centered on the first axis.

In some examples, at least two symmetry axes along the length direction of the straight-line grooves are tangent to the virtual circle.

In some examples, the other of the at least two auxiliary upper grooves and at least two auxiliary lower grooves are positioning grooves for locating the auxiliary balls.

In some examples, the at least two auxiliary upper grooves are the straight-line grooves, the at least two auxiliary lower grooves are the positioning grooves, and the maximum gap between the at least two auxiliary balls and the at least two auxiliary lower grooves is less than the maximum gap between the at least two auxiliary balls and the at least two auxiliary upper grooves.

In some examples, the initial position of each auxiliary lower groove is projected in the direction of the first axis onto a middle region of the opposite auxiliary upper groove.

In some examples, the shaft support member is fixed to the reflection substrate of the reflection base, and the shaft support member protrudes from the top surface of the reflection substrate which faces the frame, and a shaft positioning groove is provided on the bottom surface of the frame which faces the reflection substrate, and the shaft support member is accommodated in the shaft positioning groove and maintains contact with the shaft positioning groove.

In some examples, the reflection driving assembly further comprises a carrier and a second support portion provided between the carrier and the frame, and the reflective element is fixed to the carrier.

In some examples, the second support portion comprises two shaft balls, and the two shaft balls have same height and are passed through by a third axis perpendicular to the first axis and second axis, and the carrier can rotate around the third axis relative to the frame.

In some examples, the reflection driving assembly further comprises a reflective magnetic attraction portion, and the carrier is supported on the reflection base through the magnetic attraction force of the reflective magnetic attraction portion with the frame sandwiched between them.

In some examples, viewing in the direction of the first axis, the acting direction of the magnetic attraction force of the reflective magnetic attraction portion intersects with the third axis.

In some examples, the first axis and the third axis do not intersect, and the distance from the shaft support member to the third axis is less than the distance from at least two auxiliary balls to the third axis.

In some examples, the reflection driving assembly further comprises a reflection driving portion for driving the rotation of the reflective element, and the reflection driving portion comprises at least two rotating magnets fixed on the carrier and at least two rotating coils fixed on the reflection base, and the at least two rotating magnets are provided opposite to the at least two rotating coils.

In some examples, the reflection driving assembly further comprises a rotating-position sensing portion, wherein the rotating-position sensing portion comprises a first rotation sensing element and a second rotation sensing element, and the rotating-position sensing portion obtain the magnetic field change information of the reflective magnetic attraction portion of the reflection driving assembly and the magnetic field change information of the at least two rotating magnets through the first and second rotation sensing elements respectively, thereby obtaining the attitude change information of the reflective element.

According to another aspect of the present application, there provides:

a reflective module according to any one of the preceding examples;
a lens module, which is maintained on the light reflection path of the reflective module; and
an imaging module, which receives the light emitted by the lens module for imaging.

In this application, the shaft support member is fixed on the reflection base or the frame, and the first axis passing through the shaft support member is used as the rotation axis to drive the frame to rotate relative to the reflection base, so that the rotation of the frame is more accurate and less prone to deviation. Furthermore, the at least two auxiliary balls are provided between the frame and the reflection base to form a stable support plane, and one of the at least two auxiliary upper grooves formed in the frame and the at least two auxiliary lower grooves formed in the reflection base is used for accommodating at least two auxiliary balls is a straight-line groove extending along the tangent direction of the virtual circle centered on the first axis. In this way, the freedom of motion of the at least two auxiliary balls is increased, the friction is reduced, and wear between the at least two auxiliary balls and wall of the groove is also reduced, thereby improving the energy conversion efficiency of the reflection driving assembly. Correspondingly, the response speed of the reflection driving assembly is improved, and the rotation speed and accuracy of the reflective element are improved, thereby improving the imaging quality of the camera module.

According to one aspect of the present application, there provides a reflection driving assembly, which comprises:
a reflection base;
a carrier, which is rotatably mounted on the reflection base; and
a reflection driving portion, which comprises at least one first rotating magnet and at least one first rotating coil for driving the carrier to rotate around a first axis, and at least one second rotating magnet and at least one second rotating coil for driving the carrier to rotate around a third axis perpendicular to the first axis; wherein the first rotating magnet and the first rotating coil are provided opposite to each other along a second axis perpendicular to the first axis and the third axis, and the second rotating magnet and the second rotating coil are also provided opposite to each other along the second axis.

In some examples, a surface of the first rotating magnet which faces the first rotating coil has at least two magnetic pole regions provided along the direction of the third axis, and a surface of the second rotating magnet which faces the second rotating coil has at least two magnetic pole regions provided along the direction of the first axis.

In some examples, the number of first rotating magnets is two, and the number of second rotating magnets is one, and the number of first rotating coils is two, and the number of second rotating coils is one; wherein two first rotating magnets are provided on both sides of one second rotating magnet, and two first rotating coils are provided on both sides of one second rotating coil.

In some examples, the gap between the first rotating coil and the first rotating magnet is not less than the gap between the second rotating coil and the second rotating magnet, and the thickness of the first rotating coil is less than the thickness of the second rotating coil.

In some examples, the length direction of the first rotating coil and the length direction of the second rotating coil are perpendicular to each other.

In some examples, the first and second rotating magnets are fixed to the carrier, and the first and second rotating coils are fixed to the reflection base.

In some examples, the first axis and the third axis do not intersect with each other, and the first axis and the third axis are spatially perpendicular to each other.

In some examples, the second axis and third axis do not intersect with each other, and the second axis and third axis are spatially perpendicular to each other.

In some examples, the vertical distance between the first axis and the center of the first rotating magnet is 2-5.5 mm.

In some examples, the first axis is located on a side of the third axis which is away from the reflection driving portion.

In some examples, the reflection driving assembly further comprises a first rotation sensing element and a second rotation sensing element for obtaining attitude change information of the carrier, wherein the projection of the first rotation sensing element in the direction of the second axis overlaps with the third axis, and the projection of the second rotation sensing element in the direction of the second axis overlaps with the first axis.

In some examples, the height of the top surface of the first rotating magnet is lower than the height of the top surface of the second rotating magnet.

In some examples, the reflection driving assembly further comprises a frame and a first support portion provided between the reflection base and the frame, and a second support portion provided between the carrier and the frame.

In some examples, the reflection driving assembly further comprises a reflective magnetic attraction portion, wherein the carrier is supported on the reflection base through the magnetic attraction force of the reflective magnetic attraction portion with the frame sandwiched between them, and viewing in the direction of the first axis, the acting direction of the magnetic attraction force of the reflective magnetic attraction portion intersects with the third axis.

In some examples, the reflective magnetic attraction portion comprises two first reflection magnetic components and two second reflection magnetic components, and the two first reflection magnetic components are respectively fixed to the bottom surface of the carrier, and the two second reflection magnetic components are respectively fixed to the top portion of the reflection substrate of the reflection base, and viewing in the direction of the first axis, the two first reflection magnetic components are symmetrically provided relative to the third axis.

In some examples, the first support portion comprises a shaft support member and at least two auxiliary balls, wherein the shaft support member is passed through by the first axis and fixed to the reflection base or the frame, and the at least two auxiliary balls are provided between the at least two auxiliary upper grooves of the frame and the at least two auxiliary lower grooves of the reflection base, and one of the at least two auxiliary upper grooves and the at least two auxiliary lower grooves are straight-line grooves extending along the tangent direction of a virtual circle centered on the first axis.

In some examples, the at least two auxiliary upper grooves are the straight-line grooves, and the at least two auxiliary lower grooves are the positioning grooves for positioning the auxiliary balls; and wherein the initial position of each auxiliary lower groove is projected in the direction of the first axis onto the middle area of the opposite auxiliary upper groove, and the maximum gap between the at least two auxiliary balls and the at least two auxiliary lower grooves is less than the maximum gap between the at least two auxiliary balls and the at least two auxiliary upper grooves.

According to another aspect of the present application, there also provides a camera module, which comprises:
- a reflective module, which comprises a reflection driving assembly according to any one of the examples, and a reflective element installed in the reflection driving assembly;
- a lens module, which is maintained on the light reflection path of the reflective module; and
- an imaging module, which receives the light emitted by the lens module for imaging.

In the present application, at least two rotating magnet-rotating coil pairs for driving the carrier to rotate around the first and third axes are provided on the same side of the carrier; particularly, this provision mode causes the rotating magnets and rotating coils to be concentrated on one side along the second axis, so that the reflection driving assembly will not cause electromagnetic interference to other components in electronic devices within the camera module according to the present application on other sides.

Other implementation schemes and features are partially described in the following description, and those skilled in the art will understand or learn these implementation schemes and features through the practice of the disclosed subject matter after reviewing the specification. Further understanding of the features and advantages of this application can be achieved by referring to the remaining parts of the specification and drawings that constitute a part of this application.

Other implementation schemes and features are partially described in the following description, and those skilled in the art will understand or learn these implementation schemes and features through the practice of the disclosed subject matter after reviewing the specification. Further understanding of the features and advantages of this application can be achieved by referring to the remaining parts of the specification and drawings that constitute a part of this application.

DETAILED DESCRIPTION OF THE APPLICATION

Figure 1:
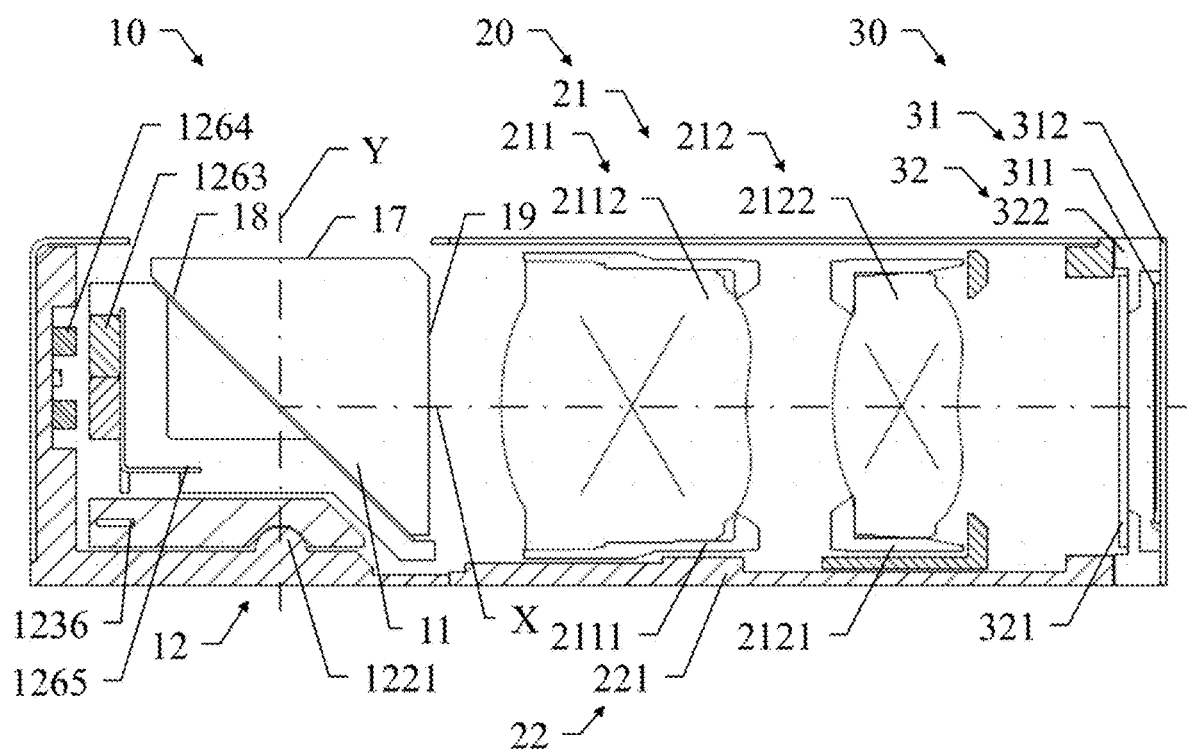
FIG. 1 is a cross-sectional schematic diagram of a camera module according to the present application.

In combination with particular implementation modes, the present application will be further described below. It should be noted that, on the premise of no conflict, the various examples or technical features described below can be arbitrarily combined to form new examples.

In the description of the present application, it should be noted that for directional words, if there are terms such as "center", "horizontal", "vertical", "length", "width", "thickness", "upper", "lower", "front", "back", "left", "right", "vertical", "horizontal", "top", "bottom", "inside", "outside", "clockwise", "counterclockwise", etc. indicating directional and positional relationships based on the directional or positional relationships shown in the drawings, it is only for the convenience of describing the present application and simplifying the description, and not to indicate or imply that the device or component referred to must have a specific orientation, be constructed and operated in a specific direction, and these terms cannot be understood as limiting the specific protection scope of this application.

It should be noted that the terms "first", "second", etc. in the specification and claims of this application are used to distinguish similar objects, and do not need to be used to describe a specific order or sequence.

The terms "including/comprising" and "having" and any variations thereof in the specification and claims of this application are intended to cover non-exclusive inclusion, for example, a process, method, system, product or device comprising a series of steps or units need not be limited to those clearly listed steps or units, but may comprise other steps or units that are not clearly listed or inherent to the process, method, product or device.

It should be noted that as used herein, the terms "basically", "approximately", and similar terms are used as expressions of approximation rather than degree, and are intended to illustrate inherent deviations in measured or calculated values that will be recognized by those skilled in the art.

In the description of this application, it should also be noted that unless otherwise specified and limited, the terms "provide/provision", "install/installation", "connect/connection", "link/linkage" should be broadly understood. For example, it can be a fixed connection, a detachable connection, or an integrated connection. It can be a mechanical connection, or an electrical connection. It can be a direct connection, a contact connection, or an indirect connection through an intermediate medium, or an internal connection between two components. For ordinary technical personnel in this field, the specific meanings of the above terms in this application can be understood based on specific circumstances.

The terms used in the description of this application are only intended to describe particular implementation schemes, and are not intended to be restrictive. As used in the specification and claims, singular forms of "a", "an", and "the" are intended to also encompass plural forms, unless the context explicitly indicates otherwise. It will also be understood that the terms "and/or" used herein refer to and include any and all possible combinations of one or more of the projects listed in association. It will also be understood that, the terms "include/including" and/or "comprise/comprising" used herein refer to the existence of the stated features, integers, steps, operations, components, and/or components, but do not exclude the existence or addition of one or more other features, integers, steps, operations, components, components, and/or their grouping.

FIGS. 1-9 illustrate a camera module and a reflective module 10 provided in the camera module according to some implementation modes of the present application. As shown in FIG. 1, the camera module includes a reflective module 10, a lens module 20, and an imaging module 30. Particularly, the reflective module 10 is used to change the propagation direction of the light from the photographed target so that the light points to the lens module 20, the lens module 20 is used to converge the light to the imaging module 30, and the imaging module 30 is used to output the resulting image. That is to say, the reflective module 10 turns the light from the target being photographed, the lens module 20 is maintained on the light reflection path of the reflective module 10 and receives the light from the reflective module 10, and the imaging module 30 is maintained on the light propagation path of the lens module 20 and receives the light emitted from the lens module 20 for imaging. In one example, the reflective module 10, lens module 20, and imaging module 30 are sequentially provided along the direction of light propagation, and the reflective module 10 and imaging module 30 are fixed on both sides of the lens module 20, respectively.

Correspondingly, the reflective module 10 includes a reflection driving assembly 12 and a reflective element 11 installed in the reflection driving assembly 12, wherein the reflective element 11 is adapted for reflecting light to turn the imaging optical path of the camera module. In one example, the reflective element 11 is adapted for turning the incident light at a certain angle and then exiting it to the lens module 20, particularly the angle may be 90°. In other words, the reflective element 11 reflects the light rays propagating in the direction of the first axis Y to the direction of the second axis X that intersects with the first axis Y at a certain angle, and the angle between the first axis Y and the second axis X may be 90°. Particularly, the first axis Y is the incident optical axis of the reflective module 10, i.e., it is also the incident optical axis of the camera module; and the second axis X is the emergent optical axis of the reflective module 10, and when the angle between the first axis Y and the second axis X is 90, the first axis Y is perpendicular to the second axis X. It should be understood that, considering manufacturing tolerances, there may be an error of up to 1° in the angle at which the reflective element 11 turns the light.

In a particular implementation mode, the reflection driving assembly 12 is adapted for driving the movement of the reflective element 11, thereby changing the propagation path of light, and realizing the optical anti-shake or camera angle adjustment function of the camera module. The reflective element 11 can be implemented as a prism (such as a prism) or a reflector. When the reflective element 11 is implemented as a prism, the reflective element 11 includes a light incident surface 17, a light reflecting surface 18, and a light emitting surface 19. The light incident surface 17 is perpendicular to the light emitting surface 19, and the light reflecting surface 18 is inclined at a 45° angle with the light incident surface 17 and the light emitting surface 19, so that the light can undergo a 90° turn at the light reflecting surface 18. When the reflective element 11 is implemented as a reflector, the reflective element 11 only comprises a light reflecting surface, which is inclined at a 45° angle with the incident light and the emergent light.

The lens module 20 includes an optical lens 21, of which an optical axis is the same as the optical axis of the lens module 20. The optical axis of the optical lens 21 is provided along the direction of the second axis X, so that the light reflected by the reflective module 10 enters the optical lens 21 in the direction of the second axis X, and is transmitted to the imaging module 30 through the optical lens 21. In one example, the optical lens 21 has a fixed focal length, and the spacing between one optical lens and another adjacent optical lens in the optical lens 21 is fixed and not adjustable. However, the optical lens 21 as a whole can be driven to move along direction of the optical axis of the optical lens 21 to achieve focusing function, or move along the direction perpendicular to the optical axis of the optical lens 21 to achieve optical anti-shake function. In another example, the optical lens 21 has a variable focal length, that is, the focal length of the lens module 20 is variable. The optical lens 21 includes at least one fixed group 211 and at least one active group 212. The distance between the fixed group 211 and the imaging module 30 in the direction of the optical axis of the optical lens 21 is fixed, and the distance between the active group 212 and the fixed group 211 or the imaging module 30 in the direction of the optical axis of the optical lens 21 is adjustable, so that the focal length of the optical lens 21 is adjustable. Particularly, the optical lens 21 includes a fixed group 211 and an active group 212, wherein the active group 212 is provided between the fixed group 211 and the imaging module 30. The fixed group 211 includes a fixed lens barrel 2111 and at least one fixed lens 2112 contained in the fixed lens barrel 2111, and the active group 212 includes an active lens barrel 2121 and at least one active lens 2122 contained in the active lens barrel 2121. It should be understandable that, there can be more than one fixed group 211 and activity group 212, depending on the specific needs.

Furthermore, the lens module 20 further includes a lens driving assembly 22, wherein the optical lens 21 is installed within the lens driving assembly 22. The lens driving assembly 22 drives the optical lens 21 to move, so as to change the propagation path of light, and thereby achieve functions such as anti-shake, focusing, and zoom. It should be understandable that, the lens driving assembly 22 can drive the overall movement of the optical lens 21 to achieve focusing or anti-shake functions. The lens driving assembly 22 can also drive partial movement of the optical lens 21, for example, the lens driving assembly 22 can drive the active group 212 of the optical lens 21 to move to achieve zoom or anti-shake functions.

The imaging module 30 includes a photosensitive assembly 31 and a light filtering assembly 32. Particularly, the photosensitive assembly 31 includes a photosensitive circuit board 312, a photosensitive chip 311 installed on the photosensitive circuit board 312, and electronic components (not shown in the figure). The photosensitive chip 311 is fixed to the photosensitive circuit board 312 by bonding, for example, and electrically connected to the photosensitive circuit board 312 by wire bonding, so that the photosensitive chip 311 receives light for imaging and then is electrically connected to the mobile electronic device through the photosensitive circuit board 312. The light filtering assembly 32 includes a light filtering bracket 322 and a light filtering element 321 installed on the light filtering bracket 322. The filter bracket 322 is fixed to the photosensitive circuit board 312 by bonding; for example, the filter element 321 is fixed to the filter bracket 322 by bonding, and is maintained on the photosensitive path of the photosensitive chip 311. The light filtering element 321 filters the light entering the photosensitive chip 311.

In some examples of this application, the imaging module 30 and the lens module 20 are fixed to each other, and the reflective module 10 and the lens module 20 are fixed to each other, thereby forming a periscope camera module with a folded optical path. It should be understood that, the mutual fixation between the reflective module 10 and the lens module 20 can be realized through an adhesive medium, for example, the reflection base 121 of the reflective module 10 and the lens base 221 of the lens module 20 can be fixed through an adhesive medium. Alternatively, the reflective module 10 and the lens module 20 can be fixed by integrated molding, for example, the reflection base 121 of the reflective module 10 and the lens base 221 of the lens module 20 can be fixed by integrated molding. In other words, the reflective module 10 and the lens module 20 use the same base, and the reflective element 11 and the optical lens 21 are installed on the same base to form an integrated periscope camera module.

As mentioned above, the reflective element 11 is adapted for turning the incident light at a certain angle and then exiting it to achieve imaging path turning. A reflection driving assembly 12 is further provided to drive the reflective element 11 to rotate, thereby achieving the optical anti-shake function or camera angle adjustment function of the camera module. Therefore, this application provides a reflection driving assembly 12 adapted for driving the rotation of the reflective element 11.

As shown in FIGS. 2-9, the reflection driving assembly 12 includes a reflection base 121, a frame 123 that supports the reflective element 11 and can rotate around the first axis Y, and a first support portion 122 provided between the reflection base 121 and the frame 123. Particularly, the first support portion 122 includes a shaft support member 1221 and at least two auxiliary balls 1222. The shaft support member 1221 is passed through by the first axis Y, and is fixed to the reflection base 121 or the frame 123. The at least two auxiliary balls 1222 are provided between at least two auxiliary upper grooves 1235 of the frame 123 and at least two auxiliary lower grooves 1216 of the reflection base 121. Herein, it should be understood that, the reflective element 11 can be directly provided on the frame 123, so that the frame 123 can directly support the reflective element 11; other elements can also be further installed between the reflective element 11 and the frame 123, so that the frame 123 may indirectly support the reflective element 11. In other words, the frame 123 is also considered to support the reflective element 11 in this application, if it supports the reflective element 11 indirectly through other elements.

Figure 3A:
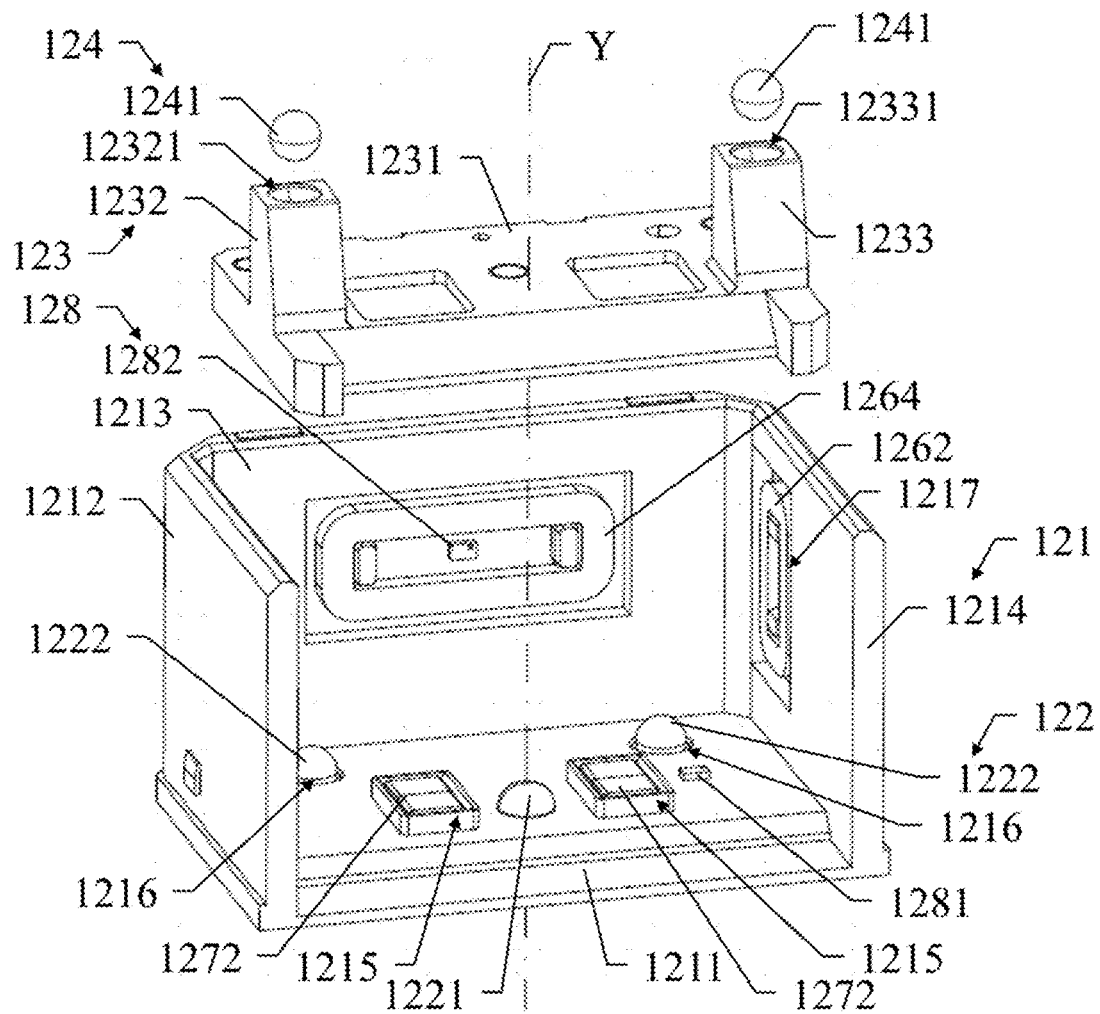
FIGS. 3A and 3B are respectively top view explosion diagram and bottom view explosion diagram of partial components including a frame and a reflection base in the reflection driving assembly according to the present application.
Figure 3B:
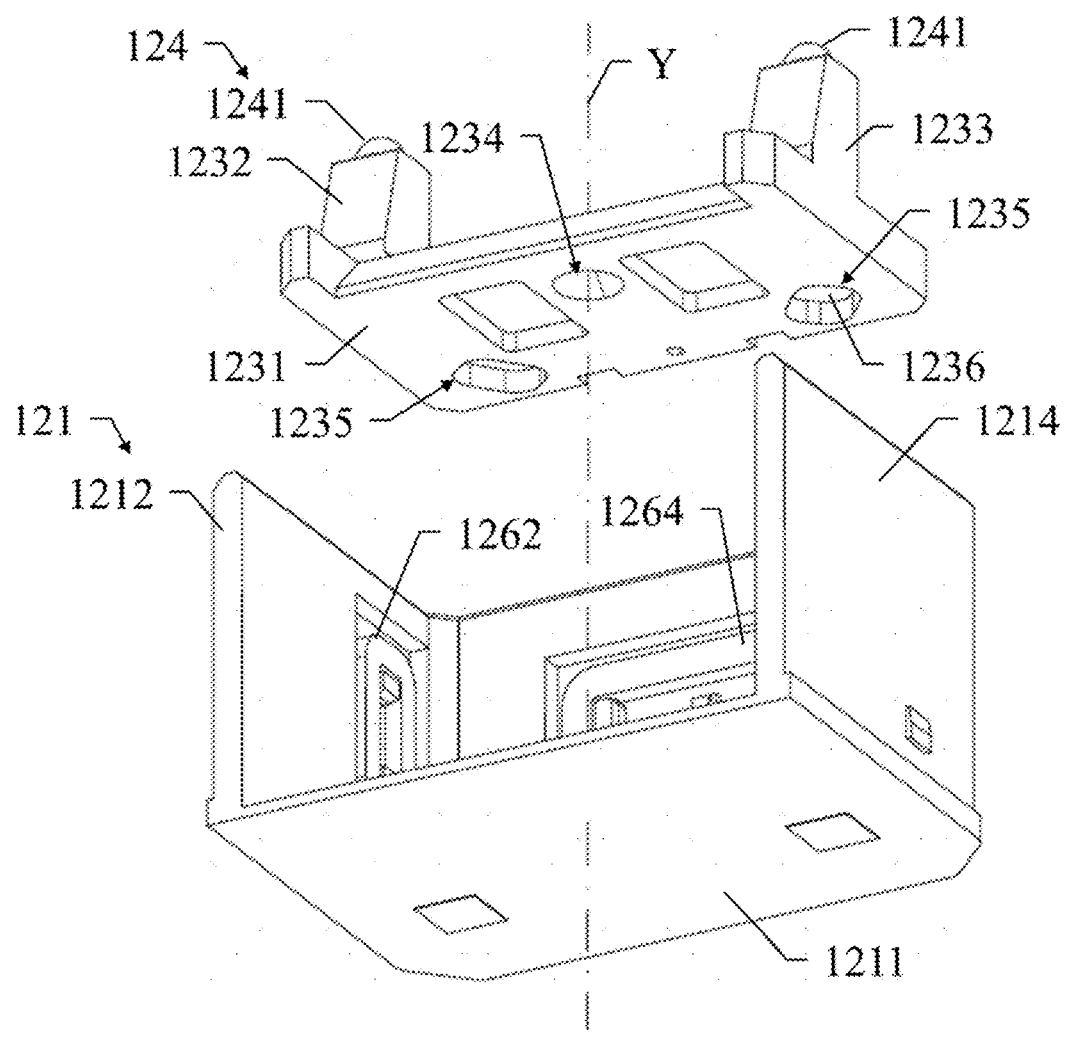

Particularly, as shown in FIGS. 3A and 3B, the reflection base 121 includes a reflection substrate 1211 and a first reflection base side portion 1212, a second reflection base side portion 1213, and a third reflection base side portion 1214 fixed around the reflection substrate 1211, wherein the first reflection base side portion 1212 and the third reflection base side portion 1214 are provided opposite to each other on both sides of the reflection substrate 1211, the second reflection base side portion 1213 is connected to the first reflection base side portion 1212 and the third reflection base side portion 1214, and the second reflection base side portion 1213 is located on one side of the reflective module 10 which is away from the emergent light, i.e., the second reflection base side portion 1213 is located on the side which is away from the lens module 20. In this way, the reflection base 121 forms an installation space and has an opening in the direction of light entering the reflective module 10 and an opening in the direction of light exiting the reflective module 10, so that the frame 123, the first support portion 122, and the reflective element 11 can all be accommodated in the installation space of the reflection base 121, and the reflective element 11 can reflect the light propagating along the first axis Y direction to the direction of the second axis X and transmit it to the lens module 20 through the above two openings.

As mentioned above, there is the first support portion 122 between the reflection base 121 and the frame 123. The frame 123 is rotatably supported above the reflection substrate 1211 of the reflection base 121 through the first support portion 122. The first support portion 122 includes a shaft support member 1221 and at least two auxiliary balls 1222. In one example, the shaft support member 1221 is fixed to the reflection substrate 1211 of the reflection base 121, and the shaft support member 1221 protrudes from the top surface of the reflection substrate 1211 which faces the frame 123. The bottom surface of the frame 123 which faces the reflection substrate 1211 has a shaft positioning groove 1234. The shaft support member 1221 is accommodated in the shaft positioning groove 1234, and maintains contact with the shaft positioning groove 1234. The shaft support member 1221 and the shaft positioning groove 1234 are provided opposite to each other along the direction of the first axis Y Particularly, the position of the shaft positioning groove 1234 corresponds to the position of the shaft support member 1221. Both the shaft positioning groove 1234 and the shaft support member 1221 are passed through by the first axis Y. The shape of the shaft support member 1221 matches the shape of the shaft positioning groove 1234. The shaft support member 1221 and the shaft positioning groove 1234 are mutually limited, and the frame 123 is limited to rotate around the first axis Y relative to the reflection base 121 through the position-limiting relationship between the shaft positioning groove 1234 and the shaft support member 1221. At this point, the first axis Y is the rotation axis of the frame 123. The first axis Y coincides with the rotation axis of the frame 123, and the frame 123 and the reflective element 11 supported on the frame 123 rotate around the first axis Y Correspondingly, the shaft support member 1221 has an arc-shaped top surface; for example, the shaft support member 1221 protrudes from the reflection substrate 1211 in a hemispherical shape. Of course, the top surface of the hemispherical shaped shaft support member 1221 can also have a plane, thereby reducing the difficulty of forming the shaft support member 1221. In this example, the shaft support member 1221 is fixed on the reflection substrate 1211 of the reflection base 121, making the rotation of the frame 123 less prone to deviation. The matching shape of the shaft positioning groove 1234 of the frame 123 with that of the shaft support member 1221 further limits the frame 123 to only rotate around the first axis Y passing through the shaft support member 1221, making the rotation of the reflective element 11 less susceptible to external influences. It is worth mentioning that, due to the fixed and immovable nature of the shaft support member 1221, the shape requirements for the shaft positioning groove 1234 are reduced. Maintaining at least three point or line contacts between the shaft positioning groove 1234 and the shaft support member 1221 can ensure that rotation axis of the frame 123 does not deviate during the rotation process of the frame 123 relative to the reflection base 121. Herein, in a particular example, line contact refers to circular line contact.

Furthermore, in a particular example, the shaft support member 1221 is made of metal material. The shaft support member 1221 is embedded in the reflection substrate 1211 through an injection molding process for insert member, thereby maintaining the durability of the shaft support member 1221. However, when the material used to form the shaft positioning groove 1234 is plastic or resin, the metal material of the shaft support member 1221 can easily cause the formation of pits on the shaft positioning groove 1234, which will affect the rotation effect of the frame 123. Therefore, the material of the shaft support member 1221 can be made consistent with the material used to form the shaft positioning groove 1234. For example, the material of the shaft support member 1221 and the material used to form the shaft positioning groove 1234 are both metal, plastic or resin, thereby reducing the probability of forming pits on the shaft positioning groove 1234. Particularly, the shaft support member 1221 is integrally formed on the top surface of the reflection substrate 1211 through injection molding process, so that the shaft support member 1221 is fixed on the top surface of the reflection substrate 1211.

It should be understood that in other examples of the present application, the shaft support member 1221 can also be fixed to the bottom surface of the frame 123, and correspondingly, the top surface of the reflection substrate 1211 correspondingly has a shaft positioning groove 1234. In other words, the shaft support member 1221 is fixed to one of the reflection base 121 and the frame 123, and the shaft positioning groove 1234 is correspondingly provided on one side of the other of the reflection base 121 and the frame 123 which faces the shaft support member 1221.

Furthermore, the first support portion 122 further includes at least two auxiliary balls 1222 for assisting the shaft support member 1221 to support the frame 123. The shaft support member 1221 and the at least two auxiliary balls 1222 form a support plane for supporting the frame 123, thereby avoiding unnecessary tilting of the frame 123 during rotation. It should be understood that in one example, the at least two auxiliary balls 1222 protrude from the reflection substrate 1211 at a height equal to the height of the shaft support member 1221 protruding from the reflection substrate 1211, so that the shaft support member 1221 and the at least two auxiliary balls 1222 can provide a horizontal support plane. Particularly, the diameter of the auxiliary ball 1222 is 0.6-1.2 mm; and in a particular example, the diameter of the auxiliary ball 1222 is 0.9 mm.

To limit the position of the at least two auxiliary balls 1222 between the frame 123 and the reflection base 121, the bottom surface of the frame 123 has at least two auxiliary upper grooves 1235, and the top surface of the reflection substrate 1211 has at least two auxiliary lower grooves 1216. The at least two auxiliary upper grooves 1235 and the at least two auxiliary lower grooves 1216 correspond to each other, and form at least two ball movement spaces, respectively. The at least two auxiliary balls 1222 are provided between the at least two auxiliary upper grooves 1235 of the frame 123 and the at least two auxiliary lower grooves 1216 of the reflection base 121. In one example, the number of the auxiliary upper grooves 1235 and the number of the auxiliary lower grooves 1216 are equal to the number of the auxiliary balls 1222, and only one auxiliary ball 1222 is accommodated between one auxiliary upper groove 1235 and one auxiliary lower groove 1216. For example, as shown in FIG. 3A of this application, the number of the auxiliary balls 1222 is two, and correspondingly, the number of the auxiliary upper grooves 1235 and the auxiliary lower grooves 1216 are also two, respectively.

Furthermore, the frame 123 is further embedded with a metal piece 1236 for supporting the auxiliary ball, and the metal piece 1236 for supporting the auxiliary ball is embedded in the frame 123 through the insert injection molding process for insert member and exposed as the bottom of the auxiliary upper groove 1235, thereby enhancing the structure of the frame 123 and making the auxiliary upper groove 1235 have a harder groove bottom.

In this application, the position-limiting relationship between the shaft support member 1221 and the shaft positioning groove 1234 provides a rotation axis for the frame 123 to rotate. The at least two auxiliary balls 1222 only serve to support the frame 123 on the reflection base 121. To reduce the resistance force generated by the auxiliary balls 1222, the at least one of the two auxiliary upper grooves 1235 and the at least two auxiliary lower grooves 1216 are straight-line grooves extending along the tangent direction of the virtual circle centered on the first axis Y Particularly, the auxiliary balls 1222 are loosely accommodated in the straight-line grooves, and the auxiliary balls 1222 only contact one point with the straight-line grooves in a minimum state, while the auxiliary balls 1222 only contact three points with the straight-line groove in a maximum state. In this way, during the rotation of the frame 123 relative to the reflection base 121, the motion freedom of the at least two auxiliary balls 1222 is increased, the friction force is reduced, and the wear between at least two auxiliary balls 1222 and wall of the grooves is reduced, thereby improving the energy conversion efficiency of the reflection driving assembly 12. Correspondingly, the response speed of the reflection driving assembly 12 is improved. It should be understood that, the straight-line groove refers to a groove that extends along the direction of a straight line. In this application, the above-mentioned straight-line groove extends in a straight line along the tangent direction of a virtual circle centered on the first axis Y, and the symmetry axes of the at least two straight-line grooves are tangent to the virtual circle along the length direction. In a particular example, the symmetry axes of the at least two auxiliary upper grooves 1235 or the at least two auxiliary lower grooves 1216 as straight-line grooves are tangent to the virtual circle centered on the first axis Y along the length direction, in other words, one of the at least two auxiliary upper grooves 1235 and the at least two auxiliary lower grooves 1216 are straight-line grooves with symmetry axes tangent to the virtual circle centered on the first axis Y along the length direction. Furthermore, the straight-line groove has two long edge groove walls and two short edge groove walls. The two long edge groove walls are provided opposite each other, and the two short edge groove walls are respectively connected to the two long edge groove walls. The two long edge groove walls are parallel to each other, and extend along the straight line. The connections between the two short side groove walls and the two long side groove walls can be arc-shaped, thereby reducing the difficulty of forming a straight-line groove. Correspondingly, a straight-line groove has a rounded rectangular shape.

Furthermore, the other of the at least two auxiliary upper grooves 1235 and the at least two auxiliary lower grooves 1216 may also be straight-line grooves. However, considering that when the at least two auxiliary upper grooves 1235 and the at least two auxiliary lower grooves 1216 are straight-line grooves, the position of the auxiliary balls 1222 is not controlled when the frame 123 is driven to rotate relative to the reflection base 121, resulting in the auxiliary balls 1222 being stuck by the auxiliary upper grooves 1235 and the auxiliary lower grooves 1216, thereby affecting the rotation of the frame 123 relative to the reflection base 121 around the first axis Y For example, during the driving process, when the auxiliary balls 1222 are located on the side closest to the rotation direction of the frame 123 in the auxiliary lower groove 1216 for accommodating the auxiliary balls 1222 and on the side farthest from the rotation direction of the frame 123 in the auxiliary upper groove 1235 or accommodating the auxiliary balls 1222, then the frame 123 is continuously driven to rotate relative to the reflection base 121. The auxiliary balls 1222 are clamped by the corresponding groove walls of the auxiliary upper groove 1235 and the auxiliary lower groove 1216, so that it is difficult for the auxiliary balls 1222 to roll or translate, thereby affecting the rotation of the frame 123. To solve this problem, it can be achieved by increasing the length of the auxiliary upper groove 1235 or the auxiliary lower groove 1216. However, increasing the length of the auxiliary upper groove 1235 or the auxiliary lower groove 1216 will occupy more space in the frame 123 or the reflection substrate 1211, causing an increase in the size of the frame 123 or the reflection substrate 1211, and thus leading to an increase in the size of the reflection driving assembly 12.

Therefore, in one example of the present application, the other of the at least two auxiliary upper grooves 1235 and the at least two auxiliary lower grooves 1216 are positioning grooves for positioning the auxiliary balls 1222, which are tightly fitted and accommodated in the positioning grooves. It is worth mentioning that, being tightly matched and placed in the positioning grooves does not mean that there is no gap between the auxiliary ball 1222 and the positioning groove. There can still be a certain gap between the auxiliary ball 1222 and the positioning groove, so that the auxiliary ball 1222 can still roll or translate in the positioning groove while being positioned by the positioning groove. Particularly, tightly fitting accommodation refers to centered arrangement of the auxiliary ball 1222 in the positioning groove, and the minimum distance between the auxiliary ball 1222 and the side wall of the positioning groove is less than 0.1 mm. Preferably, the minimum distance is less than 0.05 mm. Correspondingly, loosely fitting accommodation refers to centered arrangement of the auxiliary ball 1222 in the straight-line groove, and the minimum distance between the auxiliary ball 1222 and the long edge groove wall is greater than 0.1 mm, preferably greater than 0.15 mm. The minimum distance between the auxiliary ball 1222 and the short groove wall is at least 0.2 mm greater than the movement stroke of the auxiliary ball 1222. Correspondingly, the maximum gap between the at least two auxiliary balls 1222 and the at least two auxiliary lower grooves 1216 is less than the maximum gap between the at least two auxiliary balls 1222 and the at least two auxiliary upper grooves 1235.

It should be understood that in one particular example, the at least two auxiliary lower grooves 1216 are straight-line grooves extending along the tangent direction of a virtual circle centered on the first axis Y, and the at least two auxiliary upper grooves 1235 are positioning grooves for locating the auxiliary balls 1222. The at least two auxiliary balls 1222 are loosely accommodated in the at least two auxiliary lower grooves 1216, and the at least two auxiliary balls 1222 are tightly accommodated in the at least two auxiliary upper grooves 1235. At this time, the at least the two auxiliary balls 1222 are respectively positioned through the at least two auxiliary upper grooves 1235. In another particular example, the at least two auxiliary upper grooves 1235 are straight-line grooves extending along the tangent direction of a virtual circle centered on the first axis Y, and the at least two auxiliary lower grooves 1216 are positioning grooves for positioning the auxiliary balls 1222. The at least two auxiliary balls 1222 are loosely accommodated in the at least two auxiliary upper grooves 1235, and the at least two auxiliary balls 1222 are tightly accommodated in the at least two auxiliary lower grooves 1216. At this time, the at least two auxiliary balls 1222 are respectively positioned through the at least two auxiliary lower grooves 1216. From the perspective of driving the frame 123 to rotate relative to the reflection base 121, there are no obvious advantages or disadvantages between the two particular examples. However, considering the assembly process, the straight-line grooves cannot locate the balls, and during the installation process, the auxiliary balls 1222 need to be provided in the positioning grooves first. Therefore, to simplify the assembly process and avoid flipping the semi-finished reflection driving assembly during the assembly of the auxiliary balls 1222, it is preferable to use the at least two auxiliary lower grooves 1216 as positioning grooves for positioning the auxiliary balls 1222. Correspondingly, the gap between the at least two auxiliary balls 1222 and the at least two auxiliary lower grooves 1216 is smaller than the gap between the at least two auxiliary balls 1222 and the at least two auxiliary upper grooves 1235.

Figure 4:
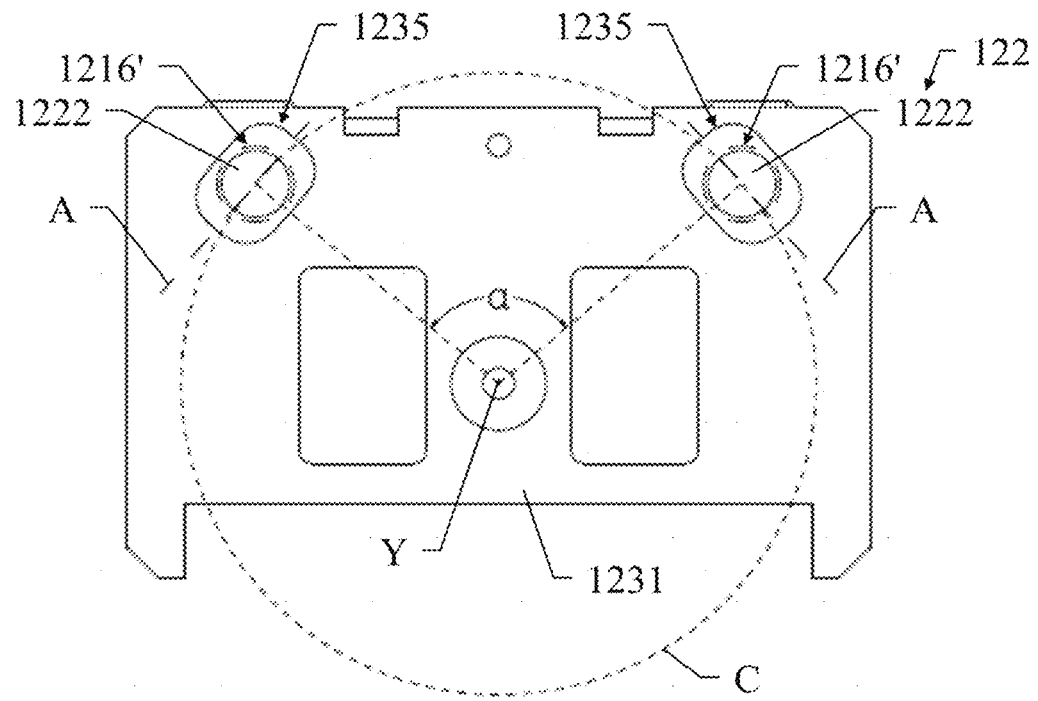
FIG. 4 is a schematic diagram of a bottom surface of the frame according to the present application.
Figure 5:
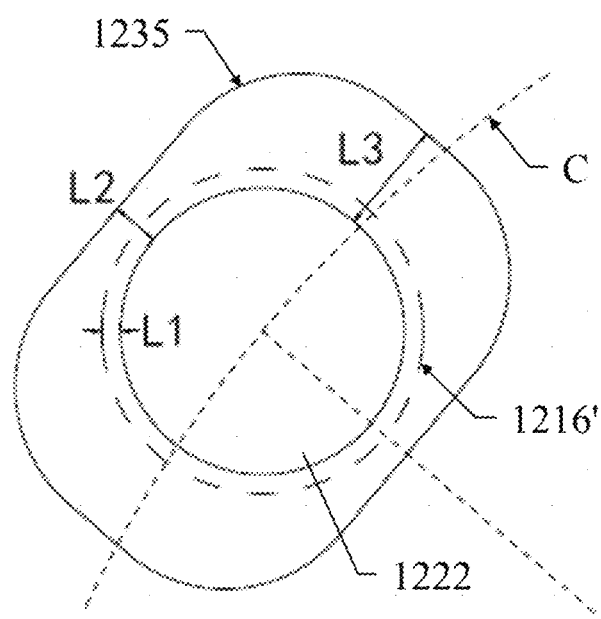
FIG. 5 is an enlarged local view of FIG. 4.

Further combining FIGS. 4-5, particularly, 1216' is a projection of the auxiliary lower groove 1216 along the direction of the first axis Y on the bottom surface of the frame 123, C is the virtual circle centered on the first axis Y, and A is a symmetry axis of the auxiliary upper groove 1235 along the length direction. In this example, the number of auxiliary balls 1222, the auxiliary upper grooves 1235, and the auxiliary lower grooves 1216 are all two. The first support portion 122 includes two auxiliary balls 1222, the bottom surface of the frame 123 has two auxiliary upper grooves 1235, the reflection substrate 1211 has two auxiliary lower grooves 1216, the two auxiliary upper grooves 1235 are symmetrically formed on the bottom surface of the frame 123, the two auxiliary lower grooves 1216 are symmetrically formed on the top surface of the reflection substrate 1211, and the two auxiliary upper grooves 1235 are respectively provided opposite to the two auxiliary lower grooves 1216, forming two ball movement spaces. Particularly, the two auxiliary upper grooves 1235 are straight-line grooves, and the two auxiliary lower grooves 1216 are positioning grooves. A virtual circle C is formed with the first axis Y as the center. The two auxiliary upper grooves 1235 extend along the tangent direction of the virtual circle C. The initial position of each auxiliary lower groove 1216 is respectively projected along the direction of the first axis Y on a middle area of the opposite auxiliary upper groove 1235. It should be understood that, the initial positions of the two auxiliary lower grooves 1216 refer to the positions of the two auxiliary lower grooves 1216 when the angle at which the frame 123 can rotate relative to the reflection base 121 in two opposite directions is equal; accordingly, when the reflection driving assembly 12 drives the frame 123 and the reflective element 11 to rotate around the first axis Y, the reflective element 11 can have a large rotation angle in both directions. In a particular example, the center points of two auxiliary upper grooves 1235 are located on the virtual circle C centered on the first axis Y.

Particularly, both auxiliary upper grooves 1235 have a symmetrical axis A that is tangent to the virtual circle C centered on the first axis Y along the length direction, and the two auxiliary balls 1222 are loosely accommodated in the two auxiliary upper grooves 1235. When the auxiliary ball 1222 is centered in the auxiliary upper groove 1235, the minimum distance L2 between the auxiliary ball 1222 and the long side groove wall of the auxiliary upper groove 1235 is greater than 0.1 mm; preferably, the minimum distance L2 is greater than 0.15 mm. The minimum distance L3 between the auxiliary ball 1222 and the short side groove wall of the auxiliary upper groove 1235 is at least 0.2 mm larger than the movement stroke of the auxiliary ball 1222. The movement stroke of the auxiliary ball 1222 is related to the angle at which the frame 123 can rotate around the first axis Y and the distance between the auxiliary ball 1222 and the first axis Y Furthermore, in one example, the angle α between the perpendicular lines from the first axis Y to the two auxiliary upper grooves 1235 is a range of 80-100°, which provides better support for the auxiliary ball 1222 during the rotation of the frame 123, and does not cause the size of the frame 123 to be too large due to the arrangement of the auxiliary upper groove 1235. In a particular example, the angle α between the perpendicular lines of the symmetry axis A along the length direction from the first axis Y to the two auxiliary upper grooves 1235 is respectively 90°.

The two auxiliary lower grooves 1216 correspond to the two auxiliary upper grooves 1235, and the two auxiliary balls 1222 are tightly matched and accommodated in the two auxiliary lower grooves 1216, respectively. When the auxiliary ball 1222 is centered in the auxiliary lower groove 1216, the minimum distance L1 between the auxiliary ball 1222 and the side wall of the auxiliary lower groove 1216 is less than 0.1 mm; preferably, the minimum distance L1 is less than 0.05 mm. Correspondingly, the maximum gap between the two auxiliary balls 1222 and the two auxiliary lower grooves 1216 is smaller than the maximum gap between the two auxiliary balls 1222 and the two auxiliary upper grooves 1235. It should be understood that, tightly fitting only indicates that when an auxiliary ball 1222 is provided between the auxiliary upper groove 1235 and the auxiliary lower groove 1216, the gap between the auxiliary ball 1222 and the auxiliary lower groove 1216 is smaller than the gap between the auxiliary ball 1222 and the auxiliary upper groove 1235, so that the auxiliary lower groove 1216 can play a positioning role, and does not mean that the auxiliary ball 1222 is stuck in the auxiliary lower groove 1216.

It should be understood that, the tightly fitting relationship between the auxiliary lower groove 1216 and the auxiliary ball 1222 determines the position of the auxiliary ball 1222 relative to the frame 123, so that when the frame 123 rotates relative to the reflection base 121, the position of the auxiliary ball 1222 will not be in an unfavorable position, which will cause the auxiliary ball 1222 to be stuck. Therefore, this implementation mode has obvious advantages. It should be understood that, more auxiliary balls 1222, as well as auxiliary upper grooves 1235 and auxiliary lower grooves 1216 for accommodating auxiliary balls 1222, can be provided, for example, all of which has the number of three, four or more, and this application is not limited to this.

Figure 6:
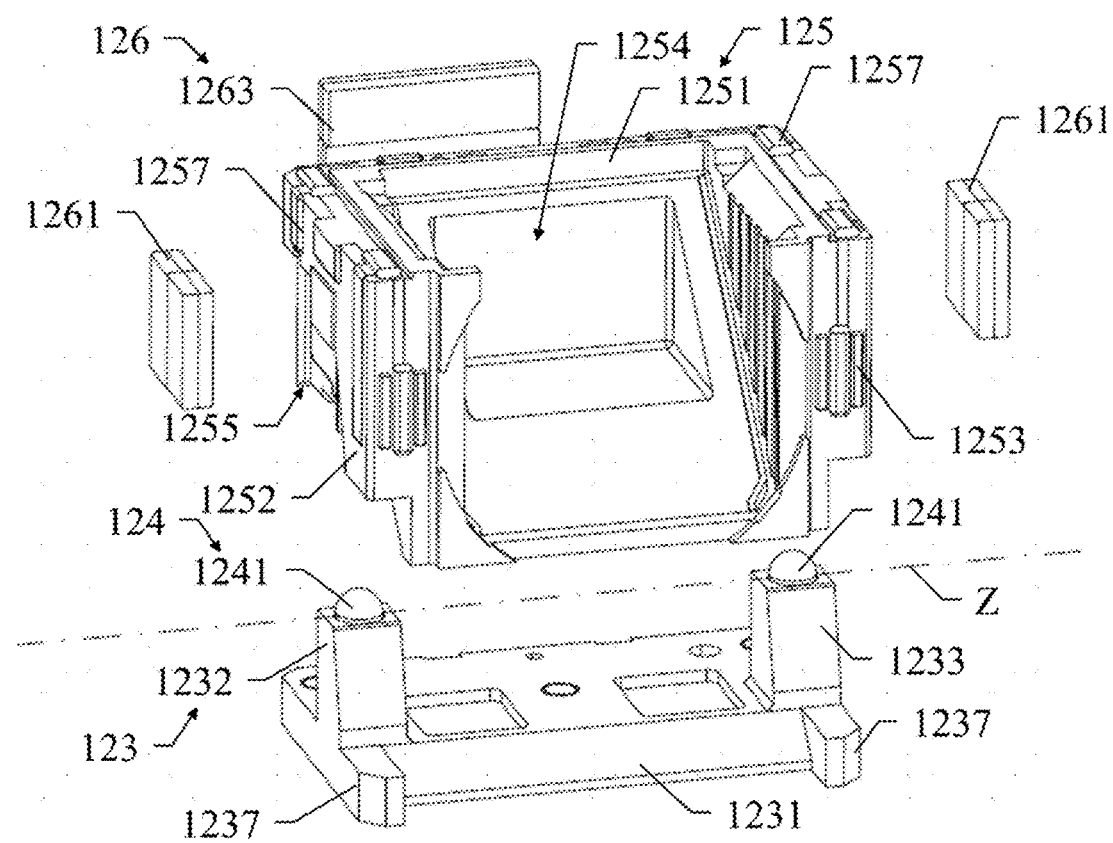
FIG. 6 is an exploded schematic diagram of partial components comprising a carrier and a frame in the reflection driving assembly according to the present application.

Referring further to FIG. 6, the reflection driving assembly 12 further includes a carrier 125, and a second support portion 124 provided between the carrier 125 and the frame 123. The reflective element 11 is fixed to the carrier 125, and the frame 123 indirectly supports the reflective element 11 through the carrier 125. Therefore, when the frame 123 is driven to rotate relative to the reflection base 121 around the first axis Y, the carrier 125 will also rotate relative to the reflection base 121 along with the frame 123 around the first axis Y. The carrier 125 is rotatably supported above the frame 123 through the second support portion 124. Particularly, the carrier 125 can rotate relative to the frame 123 around the third axis Z perpendicular to the first axis Y and the second axis X. In this way, the reflective element 11 can rotate around the first axis Y and the third axis Z, thereby adjusting the angles of the light entering into and emitting from reflective elements 11 in two directions, and achieving the function of anti-shake in two directions or adjusting the camera angle in two directions of the camera module.

Particularly, the frame 123 includes a frame main body 1231 and a first frame side portion 1232 and a second frame side portion 1233 respectively fixed on both sides of the frame main body 1231 along the direction of the third axis Z. In one example, the first frame side portion 1232 and the second frame side portion 1233 are fixed to the frame main body 1231 by integrated molding. More particularly, the first frame side portion 1232 and the second frame side portion 1233 extend in the direction of the carrier 125 from both sides of the frame main body 1231, and the top surfaces of the first frame side portion 1232 and the second frame side portion 1233 which face the carrier 125 are respectively concave downwards to form the first shaft lower groove 12321 and the second shaft lower groove 12331. The second support portion 124 includes two shaft balls 1241, which are respectively accommodated in the first shaft lower groove 12321 and the second shaft lower groove 12331. The two shaft balls 1241 have the same height and are passed through by the third axis Z perpendicular to the first axis Y and the second axis X, so that the carrier 125 supported by the two shaft balls 1241 can rotate relative to the frame 123 around the third axis Z. The first frame side portion 1232 and the second frame side portion 1233 extend from both sides of the frame main body 1231 in the direction of the carrier 125, and adjust the height of the two shaft balls 1241 through the first shaft lower groove 12321 and the second shaft lower groove 12331 respectively, thereby controlling the height of the third axis Z passing through the two shaft balls 1241. It is worth mentioning that in one example, by adjusting the height of the first frame side portion 1232 and the second frame side portion 1233 extending upwards from the frame main body 1231 and their position in the direction of the second axis X, so that the third axis Z passes through the gravity center of the reflective element 11 or is close to the gravity center of the reflective element 11, thereby maintaining the stability of the reflective element 11 while rotating around the third axis Z.

Figure 7:
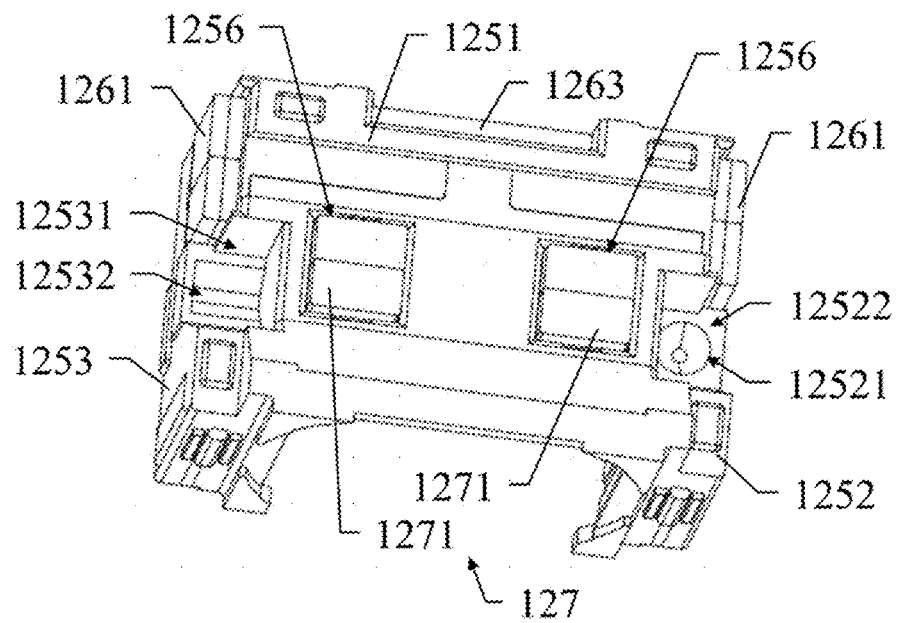
FIG. 7 is a three-dimensional schematic diagram of the carrier according to the present application.

As shown in FIGS. 6-7, the carrier 125 includes a carrier main body 1251 and a first carrier side portion 1252 and a second carrier side portion 1253 fixed on both sides of the carrier main body 1251 along the third axis Z direction. In one example, the first carrier side portion 1252 and the second carrier side portion 1253 are fixed to the carrier main body 1251 by integrated molding. More particularly, the carrier main body 1251 has an inclined mounting surface, with the first carrier side portion 1252 and the second carrier side portion 1253 fixed on both sides of the carrier main body 1251 and forming a reflective element accommodating cavity 1254 with the carrier main body 1251 having the inclined mounting surface. The reflective element 11 is fixed to the carrier 125 by being installed in the reflective element accommodating cavity 1254.

As shown in FIGS. 3A and 6-8, in order to respectively accommodate the protruding first frame side portion 1232 and second frame side portion 1233, the outer sides of the first carrier side portion 1252 and the second carrier side portion 1253, i.e. the side away from the reflective element 11, a first carrier side recess 12521 and a second carrier side recess 12531 are concavely formed respectively, so that the first frame side portion 1232 can extend into the first carrier side recess 12521 of the first carrier side portion 1252, and the second frame side portion 1233 can extend into the second carrier side recess 12531 of the second carrier side portion 1253. Furthermore, the position of the first carrier side portion 1252 which faces the first shaft lower groove 12321 has a corresponding first shaft upper groove 12522, and the position of the second carrier side portion 1253 which faces the second shaft lower groove 12331 has a corresponding second shaft upper groove 12532. The first shaft upper groove 12522 and the first shaft lower groove 12321 form a ball motion space, and the second shaft upper groove 12532 and the second shaft lower groove 12331 also form a ball motion space. The two shaft balls 1241 are respectively provided between the first shaft upper groove 12522 and the first shaft lower groove 12321, as well as between the second shaft upper groove 12532 and the second shaft groove 12331. In this way, the two shaft balls 1241 are respectively provided between the first carrier side portion 1252 and the first frame side portion 1232, as well as between the second carrier side portion 1253 and the second frame side portion 1233. It should be understood that, the two shaft balls 1241 can be rolled between the carrier 125 and the frame 123, and the two shaft balls 1241 can also be fixed onto the carrier 125 or the frame 123.

Particularly in one example, the first shaft lower groove 12321 and the second shaft lower groove 12331 respectively maintain at least three point contacts or line contacts with the two shaft balls 1241, so that the two shaft balls 1241 are determined at the first shaft lower groove 12321 and the second shaft lower groove 12331, respectively. One of the first shaft upper groove 12522 and the second shaft upper groove 12532 maintains at least three points or line contact with one of the shaft balls 1241, while the other of the first shaft upper groove 12522 and the second shaft upper groove 12532 only maintains two points contact with the other shaft ball 1241. For example, the first shaft upper groove 12522 maintains at least three points contact or line contact with one of the shaft balls 1241, while the second shaft upper groove 12532 only maintains two points contact with the other shaft ball 1241. In this way, carrier 125 can be positioned on frame 123 through one of the shaft balls 1241, while the other shaft ball 1241 does not play a positioning role, so that when the carrier 125 is supported on the frame 123 through the two shaft balls 1241, it will not be difficult to respectively arrange the two shaft balls 1241 between the first shaft upper groove 12522 and the first shaft lower groove 12321, as well as between the second shaft upper groove 12532 and the second shaft lower groove 12331 due to manufacturing tolerances of the components. In a particular example, line contact refers to circular line contact.

With further reference to FIGS. 3A and 7, the first shaft lower groove 12321, the second shaft lower groove 12331, and the first shaft upper groove 12522 are all frustum shaped grooves. The second shaft upper groove 12532 is a groove that extends along the direction of the third axis Z and has a trapezoidal cross-section, so that one of the shaft roller balls 1241 maintains line contact with the first shaft lower groove 12321 and the first shaft upper groove 12522 respectively, while the other shaft roller ball 1241 maintains line contact with the second shaft lower groove 12331 and maintains two points contact with the second shaft upper groove 12532.

Correspondingly, in the present application, the two shaft balls 1241 and the at least two auxiliary balls 1222 are respectively provided at different heights, but the two shaft balls 1241 and the at least two auxiliary balls 1222 can be provided in the reflection driving assembly 12 in the height direction (i.e., the direction of the first axis Y), which makes the assembly of the reflection driving assembly 12 simple, and it only requires to stack various components along the height direction.

In one example of the present application, as shown in FIG. 6, the surface of the carrier 125 is further fixed with a carrier buffer 1257. Particularly, the carrier buffer 1257 is fixed to the surface of the carrier 125 through a process such as secondary injection molding, thereby providing a buffering effect when the carrier 125 collides with the frame 123 or the reflection base 121. The carrier buffer 1257 can be made of flexible materials such as silicone.

It is worth mentioning that, as mentioned above, considering that the reflection base 121 has an opening facing the direction of the light exiting from the reflective module 10, in order to prevent the carrier 125 from exceeding the rotation stroke or falling off when rotating around the third axis Z, the frame 123 further includes two rotation stop members 1237. The two rotation stop members 1237 extend from both sides of the frame main body 1231 along the direction of the second axis X to the bottom of the first carrier side 1252 and the second carrier side 1253, so that the projection of the two rotation stop members 1237 in the direction of the first axis Y falls on the first carrier side 1252 and the second carrier side 1253, respectively. Therefore, when the rotation angle of the carrier 125 exceeds the designed angle, it can be stopped by the two rotation stop members 1237 and stop rotating.

Furthermore, the reflection driving assembly 12 further includes a reflection driving portion 126 for driving the rotation of the reflective element 11. The reflection driving portion 126 includes at least two rotating magnets fixed on the carrier 125 and at least two rotating coils fixed on the reflection base 121. The at least two rotating magnets are provided opposite to the at least two rotating coils, so as to drive the at least two rotating magnets to move after the at least two rotating coils are electrified. Correspondingly, the reflection driving assembly 12 may also include a reflection driving circuit, which is electrically connected to the at least two rotating coils and provides driving current. It should be understood that, the reflection driving circuit can be implemented as a flexible circuit board attached to the reflection base 121, or a conductive metal insert piece embedded in the reflection base 121.

Particularly, as shown in FIGS. 3A-3B and 6, the at least two rotating magnets include two first rotating magnets 1261 fixed on the first carrier side portion 1252 and the second carrier side portion 1253, and one second rotating magnet 1263 fixed on the carrier main body 1251. The at least two rotating coils include two first rotating coils 1262 fixed on the first reflection base side portion 1212 and the third reflection base side portion 1214, and one second rotating coil 1264 fixed on the second reflection base side portion 1213. Particularly, the two first rotating magnets 1261 and the two first rotating coils 1262 are respectively provided opposite to each other, so as to drive the carrier 125 and the reflective element 11 carried on the carrier 125 to rotate around the first axis Y after the two first rotating coils 1262 are electrified. The second rotating magnet 1263 and the second rotating coil 1264 are provided opposite to each other, so that after the second rotating coil 1264 is electrified, the frame 123, the carrier 125 carried on the frame 123, and the reflective element 11 are driven to rotate together around the third axis Z.

In one example, the first carrier side portion 1252, the second carrier side portion 1253, and one side of the carrier main body 1251 which faces the reflection base 121 respectively have a rotating magnet groove 1255. The two first rotating magnets 1261 and one second rotating magnet 1263 are fixed to the carrier 125 by being installed in three rotating magnet grooves 1255. The first reflection base side portion 1212, the third reflection base side portion 1214, and one side of the second reflection base side portion 1213 which faces the carrier 125 respectively have a rotating coil groove 1217. The two first rotating coils 1262 and one second rotating coil 1264 are fixed to the reflection base 121 by being installed in three rotating coil grooves 1217.

More particularly, as shown in FIG. 1, the reflection driving portion 126 further includes a reflection magnetic conductive plate 1265, which is embedded in the carrier 125 and provided on one side of the at least two rotating magnets which is away from the at least two rotating coils, thereby constraining the magnetic field of the rotating magnets, and enhancing the magnetic field strength of one side of the rotating magnets which faces the rotating coil.

In the above example, the first rotating magnet 1261 has two magnets, and the two magnets are respectively provided on both sides of the carrier 125. At this time, the corresponding two sides of the reflective module 10 will generate a magnetic field, which will affect other components provided near these two sides. Therefore, in order to reduce this problem, in another example of the present application, the at least two rotating magnets only include the first rotating magnet 1261 fixed on one of the first carrier side 1252 and the second carrier side 1253, and a second rotating magnet 1263 fixed on the carrier main body 1251, the other of the first carrier side 1252 and the second carrier side 1253 is not provided a second rotating magnet 1263.

Figure 8:
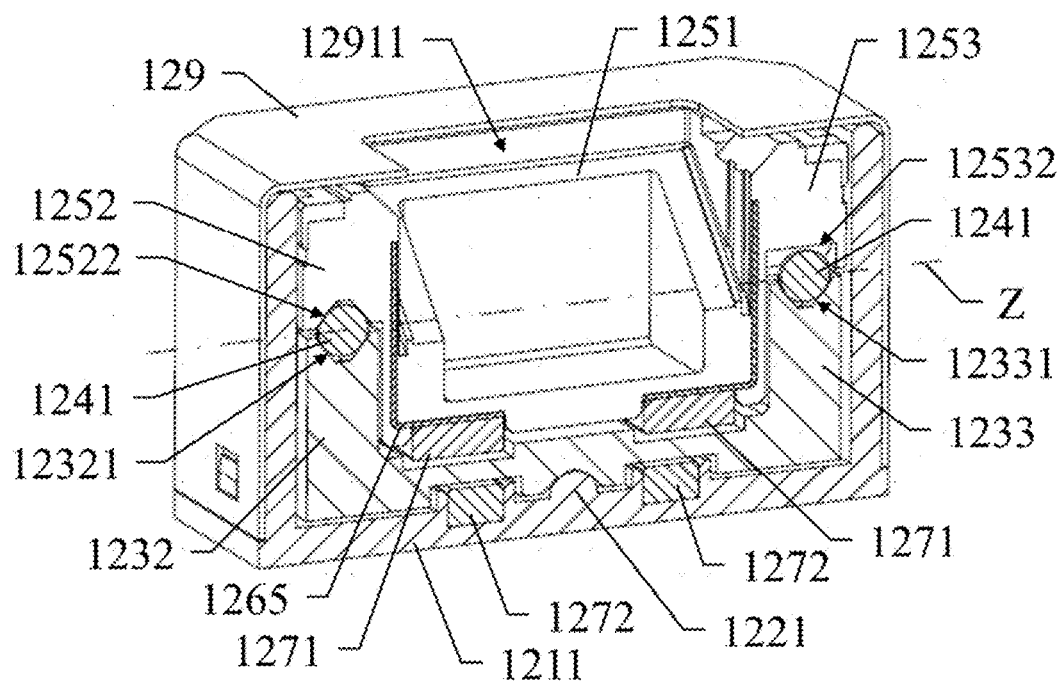
FIG. 8 is a cross-sectional schematic diagram of the reflection driving assembly according to the present application.

Furthermore, as shown in FIGS. 7 and 8, the reflection driving assembly 12 further includes a reflective magnetic attraction portion 127. The reflective magnetic attraction portion 127 includes two first reflection magnetic components 1271 and two second reflection magnetic components 1272. The two first reflection magnetic components 1271 are fixed to the bottom surface of the carrier 125, and the two second reflection magnetic components 1272 are fixed to the top surface of the reflection substrate 1211 of the reflection base 121. The two first reflection magnetic components 1271 and the two second reflection magnetic components 1272 are magnetically attracted to each other, so that the carrier 125 is magnetically attracted to the top surface of the reflection substrate 1211 with the frame 123 sandwiched between them. Correspondingly, the carrier 125 is supported on the reflection base 121 through the magnetic attraction force of the reflective magnetic attraction portion 127, with the frame 123 sandwiched between them. Particularly, one of the first reflection magnetic component 1271 and the second reflection magnetic component 1272 is implemented as a magnet, and the other of the first reflection magnetic component 1271 and the second reflection magnetic component 1272 is made of a material that can be attracted by the magnet. For example, the other of the first reflection magnetic component 1271 and the second reflection magnetic component 1272 can be implemented as a magnet or a magnet yoke.

In one example, two first reflection magnetic components 1271 protrude from the bottom surface of the carrier 125, and two second reflection magnetic components 1272 protrude from the top surface of the reflection base 121, thereby reducing the distance between the two first reflection magnetic components 1271 and the two second reflection magnetic components 1272, and increasing the magnetic attraction between the first reflection magnetic component 1271 and the second reflection magnetic component 1272. Furthermore, the positions of the frame 123 which face the two first reflection magnetic components 1271 and the two second reflection magnetic components 1272 is concave inwardly and respectively, to provide avoidance space. It should be understood that, the positions of the frame 123 which face the two first reflection magnetic components 1271 and the two second reflection magnetic components 1272 can also form two through grooves directly to provide avoidance space, but retaining some of the structure and forming four half grooves can maintain the structural strength of the frame 123.

In one example, as shown in FIG. 7, the bottom surface of carrier 125 is concave inward to form two carrier magnetic attraction grooves 1256. Two first reflection magnetic components 1271 are fixed to the bottom surface of carrier 125 by being installed separately in the two carrier magnetic attraction grooves 1256. The top surface of the reflection substrate 1211 also has two reflection base magnetic attraction grooves 1215, and two second reflection magnetic components 1272 are fixed to the top surface of the reflection substrate 1211 by being installed separately in the two reflection base magnetic attraction grooves 1215.

Figure 9:
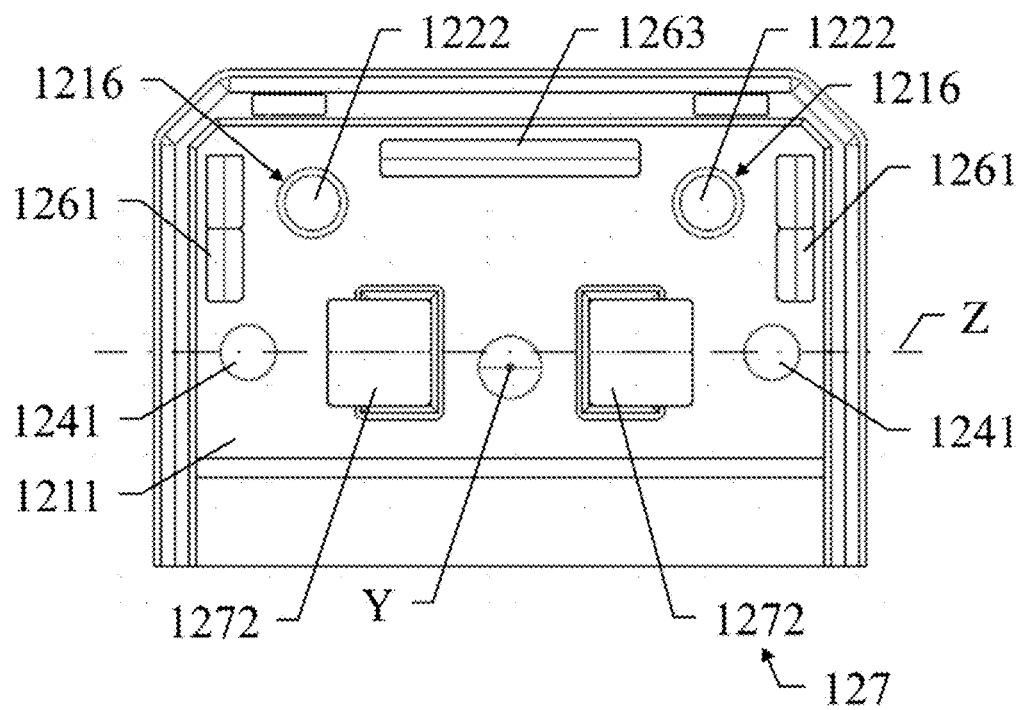
FIG. 9 is a top view schematic diagram of the reflection base in the direction along the first axis according to the present application.

It is worth noting that, FIG. 9 shows a schematic diagram of the reflection base 121 viewed from above in the direction of the first axis Y, wherein the two shaft balls 1241 and the two first reflection magnetic components 1271 are projected onto the reflection substrate 1211 of the reflection base 121 in the direction of the first axis Y It should be understood that, when the reflective magnetic attraction portion 127 makes the carrier 125 magnetically attracted onto the reflection base 121 through magnetic attraction with the frame 123 sandwiched between them, the reflective magnetic attraction portion 127 also applies magnetic attraction to the first support portion 122 and the second support portion 124. But if the magnetic attraction of the reflective magnetic attraction portion 127 does not directly act on the third axis Z of the two shaft balls 1241 passing through the second support portion 124, the magnetic attraction will affect the rotation of the carrier 125 relative to the frame 123 around the third axis Z. Particularly, when the direction of the magnetic attraction of the reflective magnetic attraction portion 127 does not intersect with the third axis Z, the magnetic attraction of the reflective magnetic attraction portion 127 does not directly act on the third axis Z, resulting in significant recovery resistance that hinders the rotation of the carrier 125 around the third axis Z, so that it is necessary to increase the thrust of the reflection driving assembly 12, thereby causing the rotation of the carrier 125 relative to the frame 123 around the third axis Z to tilt in one direction. In other words, in order to ensure the normal and stable rotation of the carrier 125 relative to the frame 123, it is necessary to control the position relationship of the acting direction of the magnetic attraction of the reflective magnetic attraction portion 127 and the third axis Z. Any deviation may cause uneven rotation or increase unnecessary thrust demand, thereby affecting the stability and efficiency of the entire system. It is worth mentioning that, the acting direction of the magnetic attraction of the reflective magnetic attraction portion 127 refers to the acting direction of the combined force of all magnetic attraction forces in the reflective magnetic attraction portion 127. For example, when two magnetic attraction component forces are generated between the two first and second reflection magnetic components 1271 and 1272 of the reflective magnetic attraction portion 127, the direction of the combined force of the two magnetic attraction component forces is the acting direction of the magnetic attraction action of the reflective magnetic attraction portion 127. Alternatively, when the reflective magnetic attraction portion 127 only generates one magnetic attraction force, the acting direction of the magnetic attraction force is the acting direction of the magnetic attraction force of the reflective magnetic attraction portion 127.

However, when the magnetic attraction force of the reflective magnetic attraction portion 127 directly acts on the shaft support member 1221 of the first support portion 122, it will increase wear on the shaft support member 1221, thereby damaging and affecting the rotation accuracy of the frame 123 relative to the reflection base 121.

In order to solve the above problem, in one example, the first axis Y around which the frame 123 rotates relative to the reflection base 121 does not intersect with the third axis Z around which the carrier 125 rotates relative to the frame 123, and there is a certain distance between the first axis Y and the third axis Z. Correspondingly, when viewing in the direction of the first axis Y, the first axis Y is not located on the third axis Z, and the third axis Z is located between the shaft support member 1221 and the at least two auxiliary balls 1222. In one particular example, the distance between the shaft support member 1221 and the third axis Z is less than the distance between the at least two auxiliary balls 1222 and the third axis Z. Furthermore, when viewing in the direction of the first axis Y, acting direction of the magnetic attraction force of the reflective magnetic attraction portion 127 intersects with the third axis Z, the magnetic attraction force of the reflective magnetic attraction portion 127 directly acts on the third axis Z, and the reflective magnetic attraction portion 127 is symmetrical about the third axis Z.

Furthermore, the reflection driving assembly 12 further includes a rotating-position sensing portion 128, which is used to obtain attitude change information of the reflective element 11. Particularly, as shown in FIG. 3A, the rotating-position sensing portion 128 includes a first rotation sensing element 1281 and a second rotation sensing element 1282, which are respectively and electrically connected to the reflection driving circuit. Particularly, in one example, the first rotation sensing element 1281 is fixed on the reflection substrate 1211, and the first rotation sensing element 1281 senses the magnetic field change of one of the first reflection magnetic components 1271 fixed on the bottom surface of the carrier 125, thereby obtaining the attitude change information of the carrier 125. Correspondingly, in this example, the first reflection magnetic component 1271 is implemented as a magnet. The second rotation sensing element 1282 is fixed on the second reflection base side portion 1213, and the second rotation sensing element 1282 senses the magnetic field change of the second rotating magnet 1263 fixed on the carrier main body 1251, thereby obtaining the attitude change information of the carrier 125. In a particular example, the second rotation sensing element 1282 is provided in the second rotating coil 1264.

In other words, the rotating-position sensing portion 128 obtains the attitude change information of the reflective element 11 by obtaining the magnetic field change information of the reflective magnetic attraction section 127 and the at least two rotating magnets through the first rotation sensing element 1281 and the second rotation sensing element 1282, respectively. Particularly, the rotating-position sensing portion 128 obtains the attitude change information of the carrier 125 and the reflective element 11 by obtaining the magnetic field changes of the first reflection magnetic component 1271 for magnetic attraction and the second rotating magnet 1263 for driving through the first and second rotation sensing elements 1281 and 1282, respectively. It should be understood that, the first rotation sensing element 1281 and the second rotation sensing element 1282 may be TMR (tunnel magneto resistance), Hall element, or driver chip, and this application is not limited to these.

Figure 2:
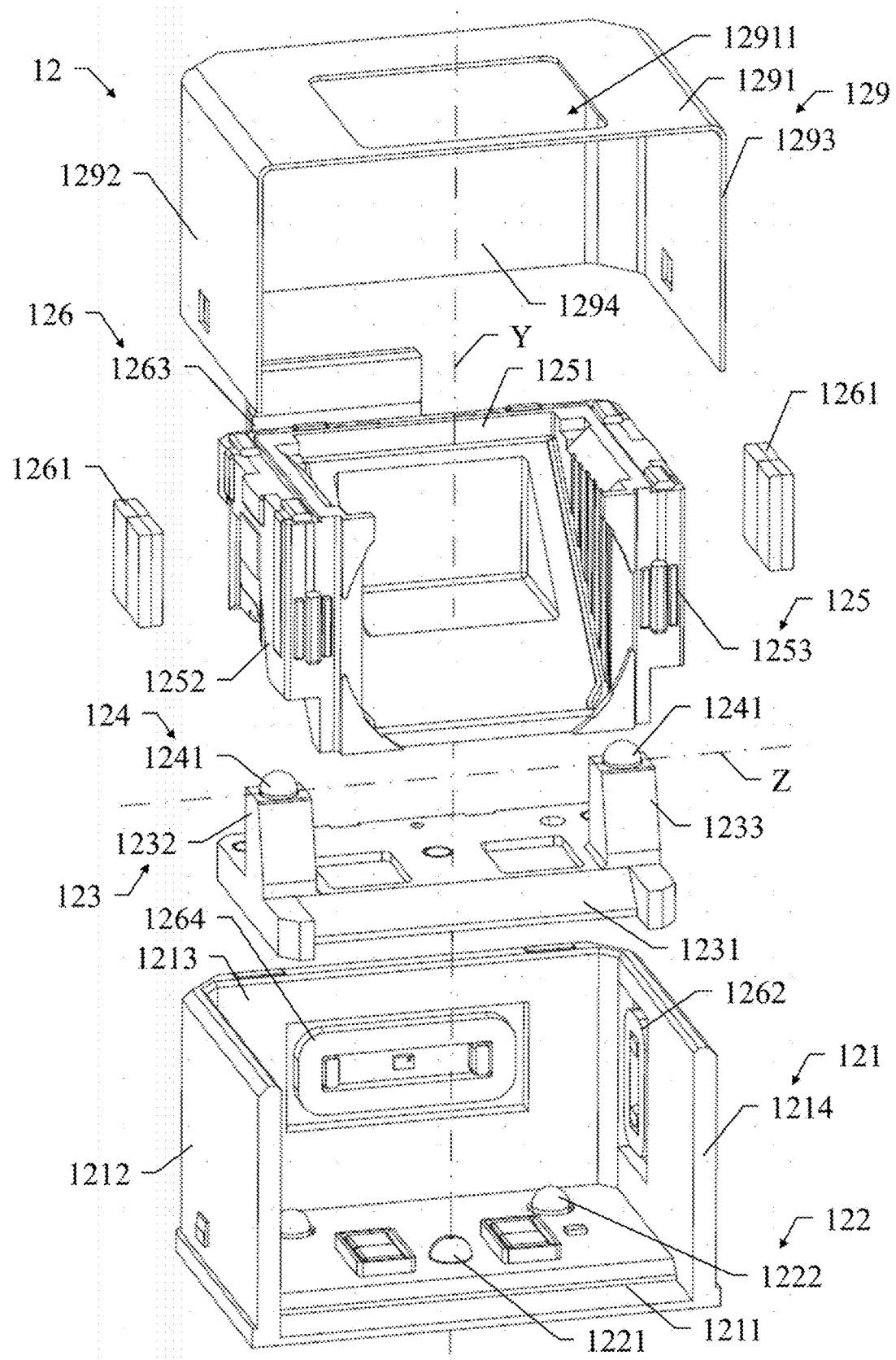
FIG. 2 is an exploded schematic diagram of a reflection driving assembly according to the present application.

Furthermore, as shown in FIG. 2, the reflection driving assembly 12 further includes a reflection cover body 129, which is fixed to the reflection base 121 and forms a accommodating space to accommodate other components of the reflection driving assembly 12. Particularly, the reflection cover body 129 includes: a reflection cover body top portion 1291; and a first reflection cover body side portion 1292, a second reflection cover body side portion 1293 and a third reflection cover body side portion 1294 which are fixed to the reflection cover body top portion 1291. Particularly, the reflection cover body top portion 1291 has an incident window 12911, the first reflection cover body side portion 1292 and the third reflection cover body side portion 1294 are provided opposite to each other on both sides of the reflection cover body top portion 1291, the second reflection cover body side portion 1293 is connected to the first reflection cover body side portion 1292 and the third reflection cover body side portion 1294, and the second reflection cover body side portion 1293 is located on the side away from the lens module 20. In this way, light can enter the reflective module 10 through the incident window 12911 at the reflection cover body top portion 1291, and leave the reflective module 10 from the side where no side portion of the reflection cover body 129 is provided.

In summary, the camera module and its reflective module 10 and reflection driving assembly 12 based on the examples of the present application are illustrated, wherein the reflection driving assembly 12 drives the reflective element 11 to rotate through a reasonable structural arrangement, thereby achieving optical anti-shake or camera angle adjustment of the camera module. Particularly, the reflection driving assembly 12 according to this application can drive the reflective element 11 to rotate at an angle of ±2.2° around the first axis Y, and drive the reflective element 11 to rotate at an angle of ±1.2° around the third axis Z.

Figure 10:
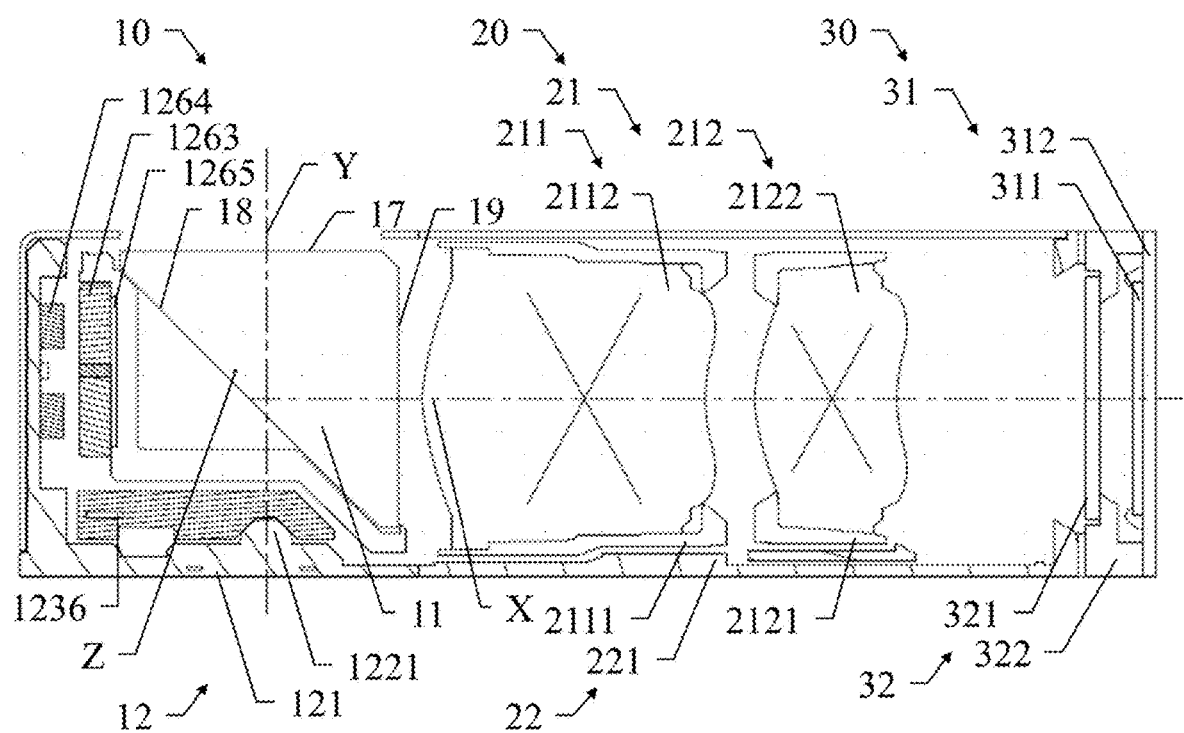
FIG. 10 is a cross-sectional schematic diagram of the camera module according to the present application.

FIGS. 10-20 illustrate the camera module and the reflection driving assembly 12 provided in the camera module according to some implementation modes of the present application. As shown in FIG. 10, the camera module includes the reflective module 10, the lens module 20, and the imaging module 30; wherein the reflective module 10 is used to change the propagation direction of the light from the photographed target so that the light points to the lens module 20, the lens module 20 is used to converge the light to the imaging module 30, and the imaging module 30 is used to output the resulting image. That is to say, the reflective module 10 turns the light from the target being photographed, the lens module 20 is maintained on the light reflection path of the reflective module 10 and receives the light from the reflective module 10, and the imaging module 30 is maintained on the light propagation path of the lens module 20 and receives the light emitted from the lens module 20 for imaging. In one example, the reflective module 10, the lens module 20, and the imaging module 30 are sequentially provided along the direction of light propagation, and the reflective module 10 and the imaging module 30 are fixed on both sides of the lens module 20, respectively.

Correspondingly, the reflective module 10 includes the reflection driving assembly 12 and the reflective element 11 installed in the reflection driving assembly 12, wherein the reflective element 11 is adapted to reflect light to fold the imaging optical path of the camera module. In one example, the reflective element 11 is adapted for turning the incident light at a certain angle and then exiting to the lens module 20, particularly the angle can be 90°. In other words, the reflective element 11 reflects the light rays propagating along the first axis Y to the direction of the second axis X that intersects with the first axis Y at a certain angle, and the angle between the first axis Y and the second axis X can be 90°. Particularly, the first axis Y is parallel or coincides with the incident optical axis of the reflective module 10, and the incident optical axis of the reflective module 10 is also the incident optical axis of the camera module. The second axis X, also known as the output optical axis of the reflective module 10, the first axis Y is perpendicular to the second axis X when the angle between the first axis Y and the second axis X is 90°. It should be understandable that, considering manufacturing tolerances, there may be an error of up to 10 in the angle at which the reflective element 11 turns the light. Furthermore, a third axis Z is defined, and the third axis Z is perpendicular to the first axis Y and the second axis X.

It is worth mentioning that in this application, the case in which two axes are perpendicular to each other can include the following two types: one is that the two axes intersect in the same plane at right angles to form a traditional vertical relationship; another type is that when two axes are located in different planes, although they do not intersect, their respective direction vectors are perpendicular to each other, thereby forming a spatial vertical relationship. In other words, the vertical relationship between any two axes in the first axis Y, the second axis X, and the third axis Z can be intersecting or spatial. When they intersect, the angle of intersection is a right angle, thereby forming the traditional vertical relationship. When they do not intersect, their respective direction vectors are perpendicular to each other, thereby forming a spatial vertical relationship. In an example, as shown in FIG. 10, the first axis Y and the third axis Z do not intersect with each other, the direction vector of the first axis Y and the direction vector of the third axis Z are perpendicular to each other, and the first axis Y and the third axis Z have a spatial perpendicular relationship with each other. Furthermore, the second axis X and the third axis Z do not intersect with each other, and the direction vectors of the second axis X and the third axis Z are perpendicular to each other, so that the second axis X and the third axis Z have a spatial perpendicular relationship with each other.

In a particular implementation mode, the reflection driving assembly 12 is adapted for driving the movement of the reflective element 11, thereby changing the propagation path of light, and realizing the optical anti-shake or camera angle adjustment function of the camera module. The reflective element 11 can be implemented as a prism (such as a triangular prism) or a reflector. When the reflective element 11 is implemented as a prism, it includes the light incident surface 17, the light reflecting surface 18, and the light emitting surface 19. The light incident surface 17 is perpendicular to the light emitting surface 19, and the light reflecting surface 18 is inclined at a 45° angle with respect to both of the light incident surface 17 and the light emitting surface 19. Therefore, the light can undergo a 90° turn at the light reflecting surface 18. When the reflective element 11 is implemented as a reflector, it only includes the light reflecting surface 18, which is inclined at a 45° angle relative to the incident light and emitting light.

The lens module 20 includes the optical lens 21, of which optical axis is the same as the optical axis of the lens module 20. The optical axis of the optical lens 21 is provided along the direction of the second axis X, so that the light reflected by the reflective module 10 enters the optical lens 21 in the direction of the second axis X and propagates through the optical lens 21 to the imaging module 30. In one example, the optical lens 21 has a fixed focal length, and the spacing between one optical lens and another adjacent optical lens in the optical lens 21 is fixed and cannot be adjusted. However, the optical lens 21 as a whole can be driven to move along the direction of the optical axis of the optical lens 21 to achieve focusing function, or move along the direction perpendicular to the optical axis of the optical lens 21 to achieve optical anti-shake function. In another example, the optical lens 21 has a variable focal length (i.e., the focal length of the lens module 20 is variable), and the optical lens 21 includes at least one fixed group 211 and at least one active group 212. The distance of the fixed group 211 relative to the imaging module 30 in the direction of the optical axis of the optical lens 21 is fixed, and the distance of the active group 212 relative to the fixed group 211 or the imaging module 30 in the direction of the optical axis of the optical lens 21 is adjustable, so that the focal length of the optical lens 21 is adjustable. Particularly, the optical lens 21 includes the fixed group 211 and the active group 212; wherein the active group 212 is provided between the fixed group 211 and the imaging module 30. The fixed group 211 includes the fixed lens barrel 2111 and the at least one fixed lens 2112 contained in the fixed lens barrel 2111, and the active group 212 include the active lens barrel 2121 and the at least one active lens 2122 contained in the active lens barrel 2121. It should be understandable that, there can be more than one fixed group 211 and activity group 212, depending on the specific needs.

Furthermore, the lens module 20 further includes the lens driving assembly 22, wherein the optical lens 21 is installed within the lens driving assembly 22. The lens driving assembly 22 drives the optical lens 21 to move, and change the propagation path of light, thereby achieving functions such as anti-shake, focusing, and zooming. It should be understandable that, the lens driving assembly 22 can drive the overall movement of the optical lens 21 to achieve focusing or anti-shake functions. The lens driving assembly 22 can also drive partial movement of the optical lens 21, for example, the lens driving assembly 22 can drive the active group 212 of the optical lens 21 to move, there achieving zooming or anti-shake functions.

The imaging module 30 includes the photosensitive assembly 31 and the light filtering assembly 32. Particularly, the photosensitive assembly 31 includes the photosensitive circuit board 312, the photosensitive chip 311 installed on the photosensitive circuit board 312, and electronic components (not shown in the figure). The photosensitive chip 311 is fixed to the photosensitive circuit board 312 by bonding, for example, electrically connected to the photosensitive circuit board 312 by wire bonding, so that the photosensitive chip 311 receives light for imaging and then is electrically connected to the mobile electronic device through the photosensitive circuit board 312. The light filtering assembly 32 includes the light filtering bracket 322 and the light filtering element 321 installed on the light filtering bracket 322. The filter bracket 322 is fixed to the photosensitive circuit board 312 by bonding, e.g., the filter element 321 is fixed to the filter bracket 322 by bonding, thereby being maintained on the photosensitive path of the photosensitive chip 311. The light filtering element 321 filters the light entering the photosensitive chip 311.

In some examples of this application, the imaging module 30 and the lens module 20 are fixed to each other, and the reflective module 10 and the lens module 20 are fixed to each other, thereby forming a periscope camera module with a folded optical path. It should be understood that, the mutual fixation between the reflective module 10 and the lens module 20 can be fixed through an adhesive medium (for example, the reflection base 121 of the reflective module 10 and the lens base 221 of the lens module 20 are fixed through an adhesive medium); alternatively, the reflective module 10 and the lens module 20 are fixed by integrated molding (for example, the reflection base 121 of the reflective module 10 and the lens base 221 of the lens module 20 are fixed by integrated molding). In other words, the same base is used by the reflective module 10 and the lens module 20, i.e., the reflective element 11 and the optical lens 21 are installed in the same base, thereby forming an integrated periscope camera module.

As mentioned above, the reflective element 11 is adapted for turning the incident light at a certain angle and then exiting it to achieve imaging path turning, and the reflection driving assembly 12 is further provided to drive the reflective element 11 to rotate, thereby achieving the optical anti-shake function or camera angle adjustment function of the camera module. Therefore, this application provides the reflection driving assembly 12 suitable for driving the rotation of the reflective element 11.

As shown in FIGS. 11-20, the reflection driving assembly 12 includes the reflection base 121, the carrier 125, and the reflection driving portion 126 for driving the carrier 125 to rotate relative to the reflection base 121. Particularly, the reflective element 11 is fixed on the carrier 125, and the carrier 125 is rotatably provided on the reflection base 121; the reflective driving part 126 includes at least two rotating magnets and at least two rotating coils, wherein the at least two rotating magnets and the at least two rotating coils are respectively fixed on the carrier 125 and the reflection base 121. The at least two rotating magnets and the at least two rotating coils are provided opposite to each other. When the rotating coil is electrified, an interaction force is generated between the rotating coil and the rotating magnet, thereby driving the carrier 125 and the reflective element 11 fixed on the carrier 125 to rotate relative to the reflection base 121. Correspondingly, the reflection driving assembly 12 may also include the reflection driving circuit, which is electrically connected to the at least two rotating coils and provides driving current. It should be understood that, the reflection driving circuit can be implemented as a flexible circuit board attached to the reflection base 121, or a conductive metal insert piece embedded in the reflection base 121.

The rotating magnet and the rotating coil are relatively provided to form a rotating magnet-rotating coil pair. After the rotating coil is electrified, an interaction force is generated between the rotating magnet and the rotating coil, thereby driving the carrier 125 to rotate relative to the reflection base 121. It should be understood that, in order to make the reflection driving assembly 12 drive the carrier 125 to rotate around the first axis Y and the third axis Z, the number of rotating magnets and rotating coils should be at least two, respectively. For example, the number of rotating magnets and the number of rotating coils can be two, three, four or more, respectively.

In one example, the reflection driving portion 126 includes at least one first rotating magnet 1261 and at least one first rotating coil 1262 for driving the carrier 125 to rotate around the first axis Y, as well as at least one second rotating magnet 1263 and at least one second rotating coil 1264 for driving the carrier 125 to rotate around the third axis Z perpendicular to the first axis Y; wherein the at least one first rotating magnet 1261 and the at least one first rotating coil 1262 are provided opposite to each other along the second axis X perpendicular to the first axis Y and the third axis Z, and the at least one second rotating magnet 1263 and the at least one second rotating coil 1264 are also provided opposite to each other along the second axis X.

In other words, the at least two rotating magnet-rotating coil pairs for driving the carrier 125 to rotate around the first axis Y and the third axis Z are provided on the same side of the carrier 125. It should be understood that, this implementation mode causes the rotating magnet and rotating coil to be concentrated on one side along the second axis X, so that the reflection driving assembly 12 will not cause electromagnetic interference to other devices on the other side.

Particularly, as shown in FIGS. 11-13B, the carrier 125 includes the carrier main body 1251 and the first carrier side portion 1252 and the second carrier side portion 1253 fixed on both sides of the carrier main body 1251 along the third axis Z direction. In one example, the first carrier side portion 1252 and the second carrier side portion 1253 are fixed to the carrier main body 1251 by integrated molding. More particularly, the carrier main body 1251 has an inclined mounting surface, with the first carrier side portion 1252 and the second carrier side portion 1253 fixed on both sides of the carrier main body 1251 and forming the reflective element accommodating cavity 1254 with the carrier main body 1251 having the inclined mounting surface. The reflective element 11 is fixed to the carrier 125 by being installed in the reflective element accommodating cavity 1254. In this way, the reflective element 11 can follow the carrier 125 to rotate around the reflection base 121, so that the reflective element 11 can rotate around the first axis Y and the third axis Z, thereby adjusting the angle at which light enters into and exits from the reflective elements 11 in two directions, and achieving the function of anti-shake in two directions or adjusting the camera angle in two directions of the camera module. It should be understood that, the inclined installation surface of the carrier main body 1251 can be further concave to form a groove, which can reduce the mass of the carrier 125 and reduce the demand for driving force without affecting the installation of the reflective element 11.

The reflection base 121 includes the reflection substrate 1211 and the first reflection base side portion 1212, the second reflection base side portion 1213, and the third reflection base side portion 1214 around and fixed onto the reflection substrate 1211. Particularly, the first reflection base side portion 1212 and the third reflection base side portion 1214 are provided opposite to each other on both sides of the reflection substrate 1211, and the second reflection base side portion 1213 is connected to the first reflection base side portion 1212 and the third reflection base side portion 1214, and the second reflection base side portion 1213 is located on the side away from the reflective module 10, i.e., the second reflection base side portion 1213 is located on the side away from the lens module 20. In this way, the reflection base 121 forms an installation space, and has an opening in the direction of light entering the reflective module 10 and an opening in the direction of light exiting the reflective module 10, so that the carrier 125 and the reflective element 11 can be accommodated in the installation space of the reflection base 121. Through the above two openings, light can enter the reflecting element 11 along the first axis Y direction, and after being reflected by the reflecting element 11, the light can also propagate along the second axis X direction to the lens module 20.

In one example of the present application, the at least one first rotating magnet 1261 and the at least one second rotating magnet 1263 are fixed to the carrier 125, and the at least one first rotating coil 1262 and the at least one second rotating coil 1264 are fixed to the reflection base 121. In this example, when the rotating coil is electrified, the rotating magnet and the carrier 125 rotate relative to the reflection base 121, achieving a dynamic magnetic reflection driving assembly 12, facilitating to simplify the circuit design of the reflection driving assembly 12, and avoiding the problem of electrifying the movable parts.

Furthermore, in order to arrange all rotating magnets and rotating coils opposite to each other along the second axis X, the at least one first rotating magnet 1261 and the at least one second rotating magnet 1263 are fixed on one side of the carrier main body 1251 which faces the second reflection base side portion 1213, and the at least one first rotating coil 1262 and the at least one second rotating coil 1264 are fixed on one side of the second reflection base side portion 1213 which faces the carrier main body 1251. It should be understood that, one side of the carrier main body 1251 which faces the second reflection base side portion 1213 is the side of the carrier 125 away from the lens module 20, and the side of the carrier main body 1251 which faces the second reflection base side portion 1213 can also be referred to as the back of the carrier 125. In other words, the at least one first rotating magnet 1261 and the at least one second rotating magnet 1263 are fixed to the back of the carrier main body 1251 which faces the second reflection base side portion 1213.

In a particular example, the number of the first rotating magnets 1261 is two, and the number of the second rotating magnets 1263 is one. The two first rotating magnets 1261 and one second rotating magnet 1263 are respectively fixed on one side of the carrier main body 1251 which faces the second reflection base side portion 1213. Particularly, the two first rotating magnets 1261 are provided on both sides of the second rotating magnet 1263, so as to balance the distribution of gravity and make the rotation of the carrier 125 fixed with rotating magnets more stable and balanced.

In a preferred example, the two first rotating magnets 1261 are symmetrically provided on both sides of the second rotating magnet 1263.

Correspondingly, the number of the first rotating coils 1262 and the second rotating coils 1264 is consistent with that of the first rotating magnets 1261 and the second rotating magnets 1263, respectively. The number of the first rotating coils 1262 is two, and the number of the second rotating coils 1264 is one. The two first rotating coils 1262 and one second rotating coil 1264 are respectively fixed on one side of the second reflection base side portion 1213 which faces the carrier main body 1251. Particularly, the two first rotating coils 1262 are provided on both sides of the second rotating coil 1264, and the two first rotating coils 1262 are provided respectively opposite to the two first rotating magnets 1261, and the second rotating coil 1264 is opposite to the second rotating magnet 1263.

It is worth mentioning that, the arrangement of two first rotating coils 1262 can also reduce the number of turns per first rotating coil 1262 while providing the same or even greater driving force, thereby avoiding the need to have a too large thickness of the first rotating coil 1262. Particularly, the thickness of the coil can be understood as the size of the coil extending along the second axis X. It should be understood that, when the thickness of the rotating coil is designed to be large, the wires far away from the rotating magnet in the rotating coil are less affected by the magnetic field of the rotating magnet, and have little effect on the driving force. The arrangement of the two rotating coils can make the thickness of the first rotating coil 1262 unnecessary to be large while having sufficient driving force. Meanwhile, when the carrier 125 rotates around the first axis Y relative to the reflection base 121, the minimum gap between the first rotating coil 1262 and the first rotating magnet 1261 on both sides will decrease. Therefore, to avoid damage caused by collision between the first rotating coil 1262 and the first rotating magnet 1261, making the first rotating coil 1262 have a smaller thickness brings a significant advantage in increasing the gap between the first rotating coil 1262 and the first rotating magnet 1261.

Figure 20:
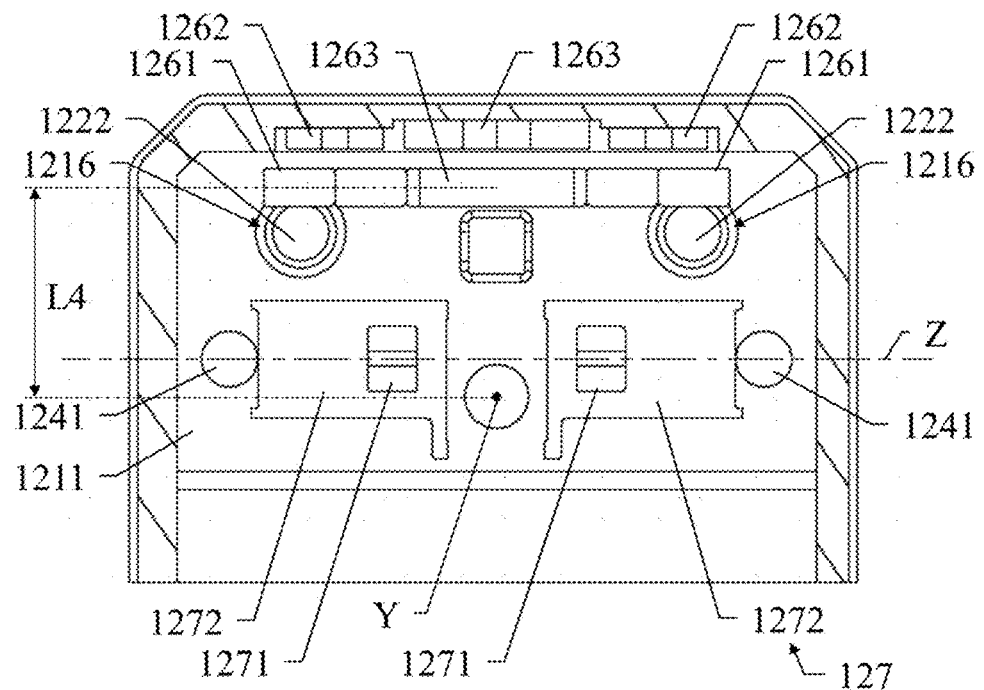
FIG. 20 is a top view schematic diagram of the reflection base in the direction along the first axis according to the present application.

Correspondingly, in one example, the gap between the first rotating coil 1262 and the first rotating magnet 1261 is not less than the gap between the second rotating coil 1264 and the second rotating magnet 1263. Particularly, the gap between the two first rotating coils 1262 and the two first rotating magnets 1261 on both sides is not less than the gap between the second rotating coil 1264 and the second rotating magnet 1263 located in the middle. Furthermore, as shown in FIG. 20, the thickness of the first rotating coil 1262 is smaller than that of the second rotating coil 1264, in order to create a larger design space for the gap between the two first rotating coils 1262 and the two first rotating magnets 1261 on both sides.

Figure 14:
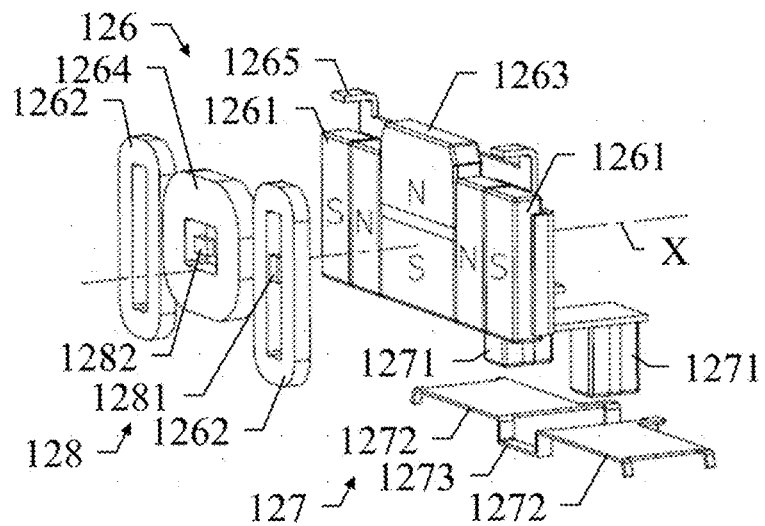
FIG. 14 is a three-dimensional schematic diagram of the reflection driving portion, a rotating-position sensing portion, and a reflective magnetic attraction portion in the reflection driving assembly according to the present application.

It is worth mentioning that in one example of the present application, the first rotating magnet 1261 and the second rotating magnet 1263 may be unipolar magnets with only one N pole and one S pole. In another example of the present application, the first rotating magnet 1261 and the second rotating magnet 1263 may be a multipole magnet with at least two N poles and at least two S poles, or a magnet composed of a combination of multiple unipolar magnets. Regardless of whether the first rotating magnet 1261 and the second rotating magnet 1263 are multipole magnets, as shown in FIG. 14, a surface of the first rotating magnet 1261 which faces the first rotating coil 1262 has at least two magnetic pole regions provided along the third axis Z, and a surface of the second rotating magnet 1263 which faces the second rotating coil 1264 has at least two magnetic pole regions provided along the first axis Y Particularly, the N-pole region and S-pole region on the surface of the first rotating magnet 1261 which faces the first rotating coil 1262 are provided along the direction of the third axis Z, while the N-pole region and S-pole region on the surface of the second rotating magnet 1263 which faces the second rotating coil 1264 are provided along the direction of the first axis Y. Correspondingly, in the direction of the third axis Z, the size of the second rotating magnet 1263 is greater than that of the first rotating magnet 1261. It should be understood that in this application, the magnetic pole region refers to an N-pole region or an S-pole region.

Rotating magnets with multiple N and S poles can provide higher magnetic flux and more complex magnetic field distribution, thereby providing more precise control. It should be understood that, the second rotating magnet 1263 is located at the middle of the two first rotating magnets 1261. When the second rotating magnet 1263 is implemented as composed of two unipolar magnets, the installation and arrangement of the two unipolar magnets will become difficult due to the magnetic field influence of the first rotating magnets 1261 on both sides. Therefore, in a particular example, the second rotating magnet 1263 located in the middle is a multipolar magnet with two N poles and two S poles instead of being composed of two unipolar magnets. Furthermore, considering that the size of the second rotating magnet 1263 in the direction of the third axis Z should be designed as large as possible, in order to maximize the driving force for rotation around the third axis Z, and there will be a demagnetized zone in the middle of the multipole magnet; accordingly, the two first rotating magnets 1261 can be composed of two unipolar magnets respectively, thereby avoiding the presence of demagnetized zones, and reducing the space occupied by the two first rotating magnets 1261 in the direction of the third axis Z.

Figure 12A:
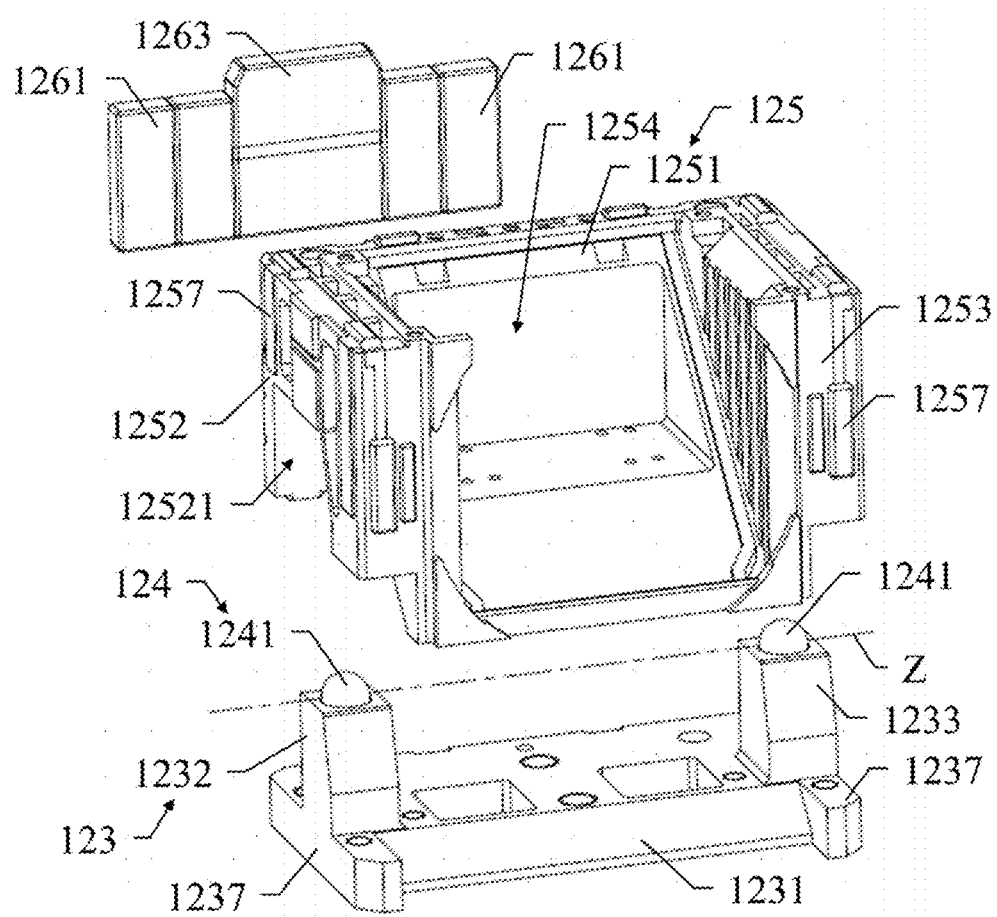
FIG. 12A is an exploded schematic diagram of partial components comprising the carrier and the frame in the reflection driving assembly according to the present application.
Figure 12B:
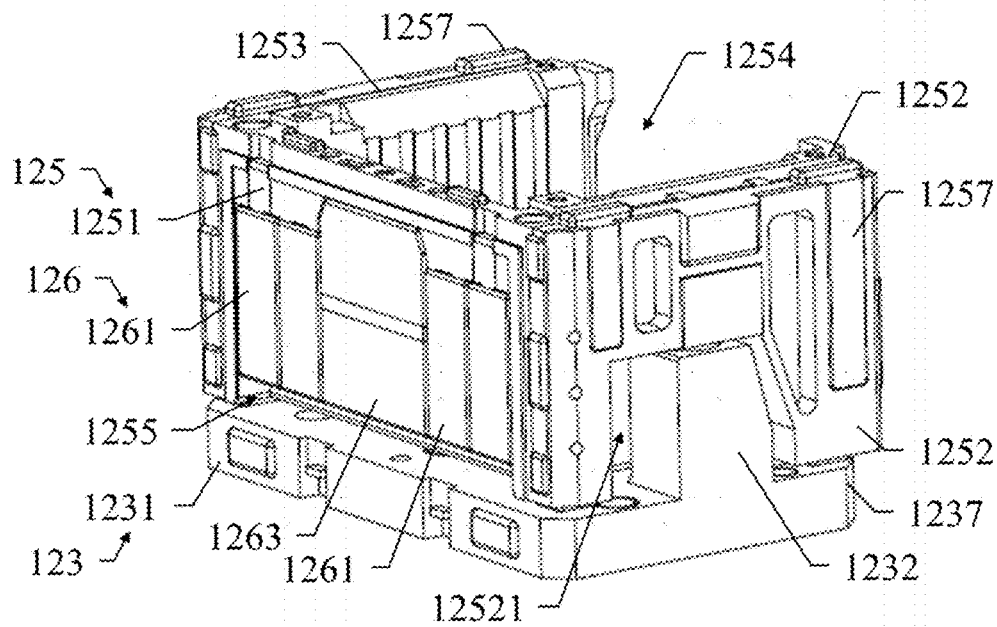
FIG. 12B is a three-dimensional schematic diagram of the carrier and the frame assembled together according to the present application.

Furthermore, as shown in FIG. 12B, one side of the carrier main body 1251 which faces the reflection base 121 is concave inward to form the rotating magnet groove 1255, and the two first rotating magnets 1261 and one second rotating magnet 1263 are fixed in the rotating magnet groove 1255. One side of the side portion 1213 of the second reflection base which faces the carrier 125 is concave inward to form the rotating coil groove 1217, and the two first rotating coils 1262 and one second rotating coil 1264 are fixed to the reflection base 121 by being installed in the rotating coil groove 1217. In one example, the reflection driving portion 126 further includes the reflection magnetic conductive plate 1265, which is embedded in the carrier 125 and provided on one side of the at least two rotating magnets which is away from the at least two rotating coils, thereby constraining the magnetic field of the rotating magnet and enhancing the magnetic field strength of one side of the rotating magnet which faces the rotating coil. In a particular example, the reflection magnetic conductive plate 1265 is exposed and serves as the bottom of the rotating magnet groove 1255.

Figure 13A:
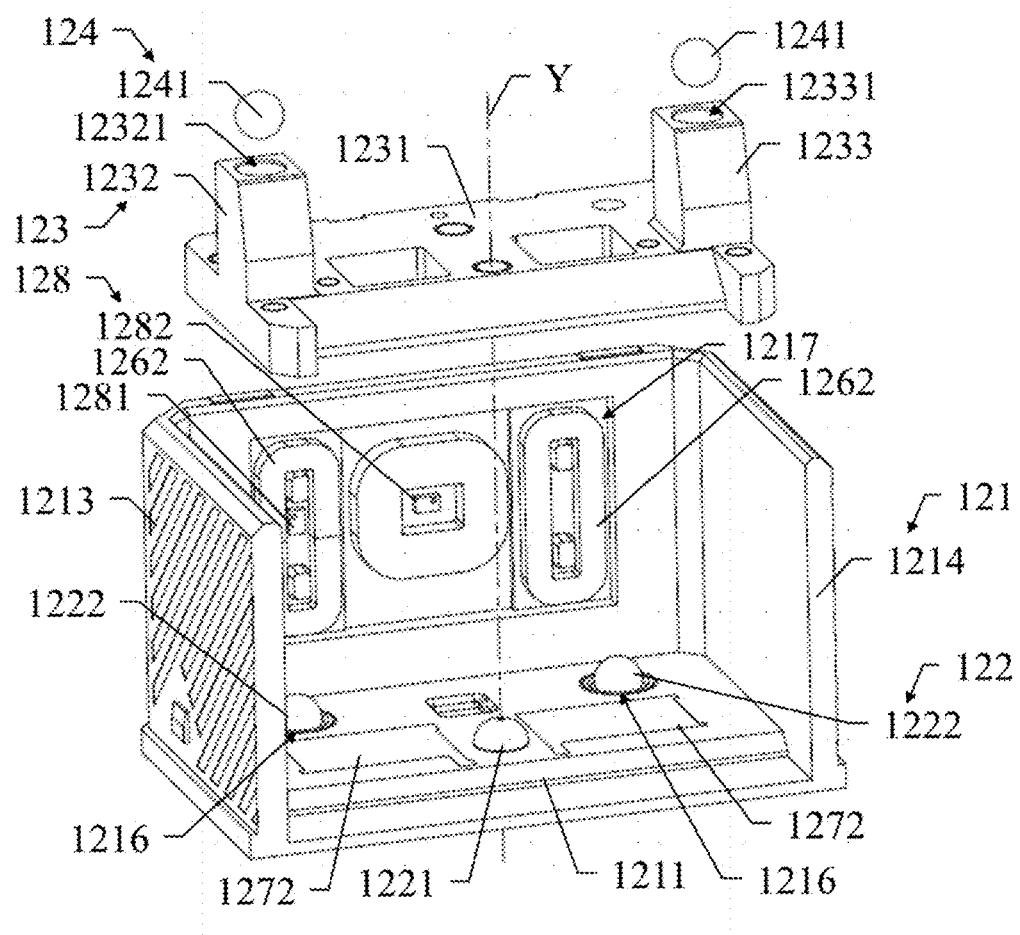
FIGS. 13A and 13B are respectively top view explosion diagram and bottom view explosion diagram of partial components comprising the frame and the reflection base in the reflection driving assembly according to the present application.
Figure 13B:
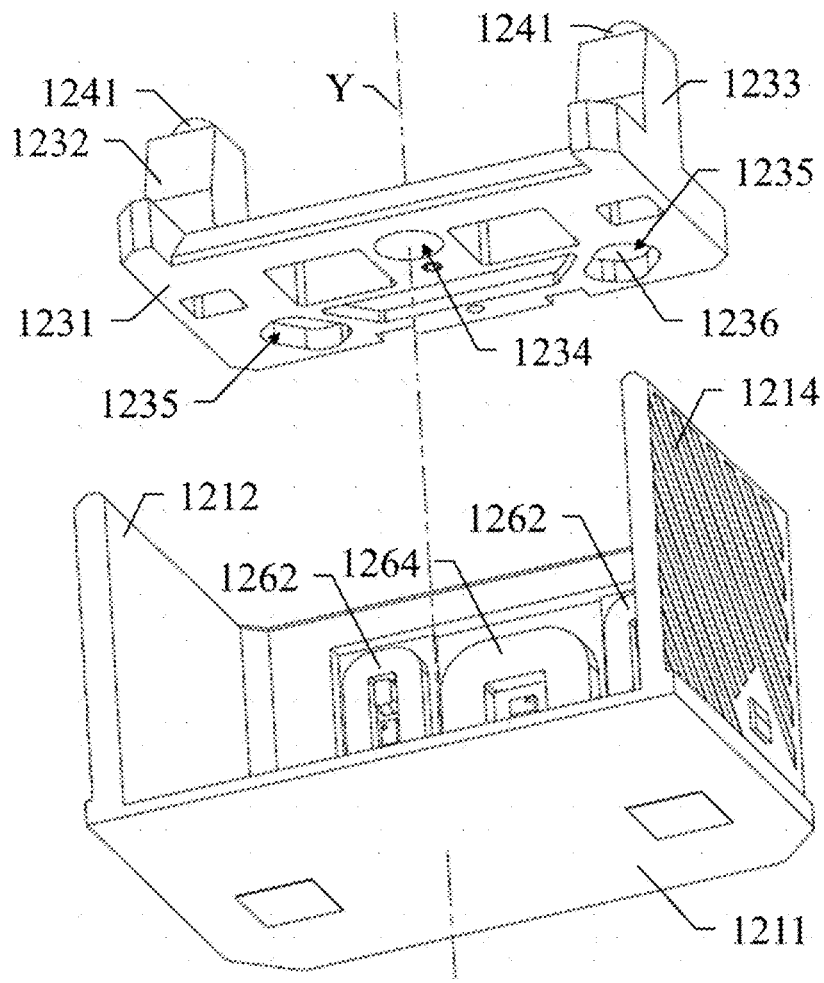
Figure 15:
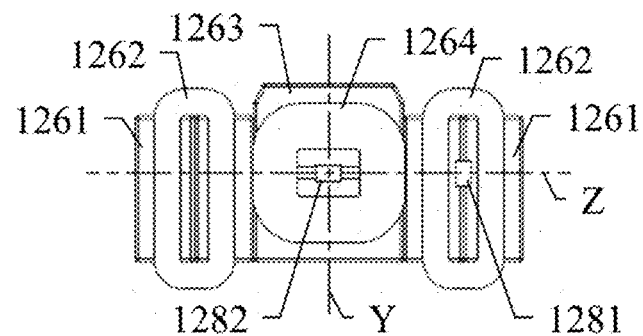
FIG. 15 is a schematic diagram of the position relationship between the reflection driving portion and the rotating-position sensing portion in the reflection driving assembly according to the present application.

Furthermore, the reflection driving assembly 12 further includes the rotating-position sensing portion 128, which is used to obtain attitude change information of the carrier 125, and thereby obtain attitude change information of the reflective element 11 installed on the carrier 125. Particularly, as shown in FIGS. 13A, 14-15, the rotating-position sensing portion 128 includes the first rotation sensing element 1281 and the second rotation sensing element 1282 for obtaining attitude change information of the carrier 125; wherein the first and second rotation sensing elements 1281 and 1282 are respectively electrically connected to the reflection driving circuit. In one example, the first rotation sensing element 1281 and the second rotation sensing element 1282 are both fixed to the side portion of the second reflection base 1213, wherein the first rotation sensing element 1281 is provided in the middle of one of the first rotating coils 1262 and faces one of the first rotating magnets 1261, wherein the first rotation sensing element 1281 is used to sense the attitude change information of the carrier 125 while rotating around the first axis Y The second rotation sensing element 1282 is provided in the middle of the second rotation coil 1264 and faces the second rotating magnet 1263, wherein the second rotation sensing element 1282 is used to sense the attitude change information of the carrier 125 while rotating around the third axis Z. It should be understood that in this application, the first rotation sensing element 1281 and the second rotation sensing element 1282 may be TMR (tunnel magneto resistance), Hall element, or driver chip, and this application is not limited to these.

More particularly, due to the need for carrier 125 to rotate around the first axis Y and the third axis Z, when the first and second rotation sensing elements 1281 and 1282 detect positional changes in one direction, they will be affected by positional changes in other direction. Therefore, in order to reduce the impact of positional changes in other directions on sensing accuracy, in a particular example of the present application, as shown in FIG. 15, the projection of the first rotation sensing element 1281 along the direction of the second axis X overlaps with the third axis Z, and the projection of the second rotation sensing element 1282 along the direction of the second axis X overlaps with the first axis Y Furthermore, considering that a rotation sensing element will have a good detection effect when it is provided opposite to a connecting region of the N-pole and S-pole regions of the rotating magnet, correspondingly, the first rotation sensing element 1281 is provided opposite to a connecting region of the N-pole and S-pole regions of the first rotating magnet 1261, and the second rotation sensing element 1282 is provided opposite to a connecting region of the N-pole and S-pole regions of the second rotating magnet 1263.

In this application, the main portion of the first rotating coil 1262 which interacts with the first rotating magnet 1261 is the portion of the first rotating coil 1262 which extends along the direction of the first axis Y Therefore, the first rotating coil 1262 has a length direction which extends along the direction of the first axis Y The main portion of the second rotating coil 1264 which interacts with the second rotating magnet 1263 is the portion of the second rotating coil 1264 which extends along the direction of the third axis Z. Therefore, the second rotating coil 1264 has a length direction which extends along the third axis Z. The length direction of the first rotating coil 1262 and the length direction of the second rotating coil 1264 are perpendicular to each other. Correspondingly, in a particular example, the first rotation sensing element 1281 provided in the first rotating coil 1262 is perpendicular to the second rotation sensing element 1282 provided in the second rotating coil 1264.

Furthermore, referring to FIGS. 11-13B, in this application, the reflection driving assembly 12 further includes: the frame 123, the first support portion 122 provided between the reflection base 121 and the frame 123, and the second support portion 124 provided between the carrier 125 and the frame 123. Particularly, the frame 123 is rotatably supported on the reflection base 121 through the first support portion 122, the carrier 125 is rotatably supported on the frame 123 through the second support portion 124, then the carrier 125 is rotatably provided on the reflection base 121, and the frame 123 indirectly carries the reflective element 11 through the carrier 125. Particularly, the carrier 125 rotates relative to the frame 123 around the third axis Z, and the frame 123 rotates relative to the reflection base 121 around the first axis Y When the frame 123 is driven to rotate relative to the reflection base 121 around the first axis Y, the carrier 125 will also rotate along with the frame 123 relative to the reflection base 121 around the first axis Y In this way, the reflective element 11 can rotate around the first axis Y and the third axis Z, thereby adjusting the angle at which light enters into and emits from the reflective elements 11 in both directions, and achieving the function of anti-shake in two directions or adjusting the camera angle in two directions of the camera module.

As mentioned above, the first support portion 122 is provided between the reflection base 121 and the frame 123, and the frame 123 is rotatably supported above the reflection substrate 1211 of the reflection base 121 through the first support portion 122. The first support portion 122 includes the shaft support member 1221 and at least two auxiliary balls 1222. The shaft support member 1221 is passed through by the first axis Y and fixed to the reflection base 121 or the frame 123. The at least two auxiliary balls 1222 are provided between at least two auxiliary upper grooves 1235 of the frame 123 and at least two auxiliary lower grooves 1216 of the reflection base 121. In one example, the shaft support member 1221 is fixed to the reflection substrate 1211 of the reflection base 121, and the shaft support member 1221 protrudes from the top surface of the reflection substrate 1211 which faces the frame 123. The bottom surface of the frame 123 which faces the reflection substrate 1211 has the shaft positioning groove 1234. The shaft support member 1221 is accommodated in the shaft positioning groove 1234, and maintains contact with the shaft positioning groove 1234. The shaft support member 1221 and the shaft positioning groove 1234 are provided opposite to each other along the first axis Y direction. Particularly, the position of the shaft positioning groove 1234 corresponds to the position of the shaft support member 1221. Both of the shaft positioning groove 1234 and the shaft support member 1221 are passed through by the first axis Y The shape of the shaft support member 1221 matches the shape of the shaft positioning groove 1234. The positions of the shaft support member 1221 and the shaft positioning groove 1234 are mutually limited, and the frame 123 is limited to rotate relative to the reflection base 121 around the first axis Y through the position-limiting relationship between the shaft positioning groove 1234 and the shaft support member 1221. At this point, the first axis Y is the rotation axis of frame 123, the first axis Y coincides with the rotation axis of frame 123, and frame 123 and the reflective element 11 carried on frame 123 rotate around the first axis Y Correspondingly, the shaft support member 1221 has an arc-shaped top surface, for example, the shaft support member 1221 protrudes from the reflection substrate 1211 in a hemispherical shape. Of course, the top surface of the hemispherical shaped shaft support member 1221 can also have a plane, thereby reducing the difficulty of forming the shaft support member 1221. In this example, the shaft support member 1221 is fixed on the reflection substrate 1211 of the reflection base 121, making the rotation of the frame 123 less prone to deviation. The matching shapes of the shaft positioning groove 1234 of the frame 123 and the shaft support member 1221 further limit the frame 123 to only rotate around the first axis Y passing through the shaft support member 1221, making the rotation of the reflective element 11 less susceptible to external influences. It is worth mentioning that, due to the fixed and immovable nature of the shaft support member 1221, the shape requirements for the shaft positioning groove 1234 are reduced. Maintaining at least three point or line contacts between the shaft positioning groove 1234 and the shaft support member 1221 can ensure that the frame 123 does not deviate from its rotation axis during the process of its rotation relative to reflection base 121. Herein, in a particular example, line contact refers to circular line contact.

Furthermore, in a particular example, the shaft support member 1221 is made of metal material, and the shaft support member 1221 is embedded in the reflection substrate 1211 through an insert injection molding process, thereby maintaining the durability of the shaft support member 1221. However, when the material used to form the shaft positioning groove 1234 is plastic or resin, the metal material of the shaft support member 1221 can easily cause the shaft positioning groove 1234 to form pits, thereby affecting the rotation effect of the frame 123. Therefore, the material of the shaft support member 1221 can be made consistent with the material used to form the shaft positioning groove 1234. For example, the material of the shaft support member 1221 and the material used to form the shaft positioning groove 1234 are both metal, plastic or resin, thereby reducing the probability of the shaft positioning groove 1234 to form pits. Particularly, the shaft support member 1221 is integrally formed on the top surface of the reflection substrate 1211 through injection molding process, so that the shaft support member 1221 is fixed on the top surface of the reflection substrate 1211.

It should be understood that in other examples of the present application, the shaft support member 1221 can also be fixed to the bottom surface of the frame 123, and correspondingly, the top surface of the reflection substrate 1211 has the shaft positioning groove 1234. In other words, the shaft support member 1221 is fixed to one of the reflection base 121 and the frame 123, and the shaft positioning groove 1234 is correspondingly provided on one side of the other of the reflection base 121 and the frame 123 which faces the shaft support member 1221.

Furthermore, the first support portion 122 further includes at least two auxiliary balls 1222 for assisting the shaft support member 1221 to support the frame 123. The shaft support member 1221 and the at least two auxiliary balls 1222 form a support plane for supporting the frame 123, thereby avoiding unnecessary tilting of the frame 123 during the rotation process. It should be understood that in one example, the at least two auxiliary balls 1222 protrude from the reflection substrate 1211 at a height equal to the height of the shaft support member 1221 protruding from the reflection substrate 1211, so that the shaft support member 1221 and the at least two auxiliary balls 1222 can provide a horizontal support plane. Particularly, the diameter of an auxiliary ball 1222 is 0.6-1.2 mm, including 0.6 mm and 1.2 mm. In a particular example, the diameter of an auxiliary ball 1222 is 0.9 mm.

To limit the position of the at least two auxiliary balls 1222 between the frame 123 and the reflection base 121, the bottom surface of the frame 123 has at least two auxiliary upper grooves 1235, and the top surface of the reflection substrate 1211 has at least two auxiliary lower grooves 1216. The at least two auxiliary upper grooves 1235 and the at least two auxiliary lower grooves 1216 correspond to each other, and form at least two ball movement spaces, respectively. The at least two auxiliary balls 1222 are provided between the at least two auxiliary upper grooves 1235 of the frame 123 and the at least two auxiliary lower grooves 1216 of the reflection base 121. In one example, the number of the auxiliary upper grooves 1235 and the auxiliary lower grooves 1216 are equal to the number of the auxiliary balls 1222, and only one auxiliary ball 1222 is accommodated between one auxiliary upper groove 1235 and one auxiliary lower groove 1216. For example, as shown in FIG. 13A of this application, the number of the auxiliary balls 1222 is two, and correspondingly, the number of the auxiliary upper grooves 1235 and the auxiliary lower grooves 1216 are also two, respectively. It should be understood that, in order to improve the reliability of the reflection driving assembly 12, the depth of the auxiliary upper groove 1235 and the auxiliary lower groove 1216 is smaller than the radius of the auxiliary ball 1222, so that when the auxiliary ball 1222 is provided in the auxiliary upper groove 1235 or the auxiliary lower groove 1216, at least half of the auxiliary ball 1222 is exposed from the auxiliary upper groove 1235 or the auxiliary lower groove 1216.

Furthermore, the frame 123 is further embedded with a metal piece 1236 for supporting the auxiliary ball, and the metal piece 1236 for supporting the auxiliary ball is embedded in the frame 123 through the insert injection molding process for insert piece and exposed as the bottom of the auxiliary upper groove 1235, thereby enhancing the structure of the frame 123 and making the auxiliary upper groove 1235 have a harder groove bottom.

In this application, the position-limiting relationship between the shaft support member 1221 and the shaft positioning groove 1234 provides a rotation axis for the frame 123 to rotate. The at least two auxiliary balls 1222 only serve to support the frame 123 on the reflection base 121. To reduce the resistance force generated by the auxiliary balls 1222, at least one of the two auxiliary upper grooves 1235 and the at least two auxiliary lower grooves 1216 is a straight-line groove extending along the tangent direction of the virtual circle centered on the first axis Y Particularly, the auxiliary balls 1222 are loosely accommodated in the straight-line groove, and the auxiliary balls 1222 only contact one point with the straight-line groove in a minimum state, while the auxiliary balls 1222 only contact three points with the straight-line groove in a maximum state. In this way, during the rotation of the frame 123 relative to the reflection base 121, the motion freedom of the at least two auxiliary balls 1222 is increased, the friction force is reduced, and the wear between the at least two auxiliary balls 1222 and walls of the groove is reduced, thereby improving the energy conversion efficiency of the reflection driving assembly 12. Correspondingly, the response speed of the reflection driving assembly 12 is improved. It should be understood that, a straight-line groove refers to a groove that extends along the direction of a straight line. In this application, the above-mentioned straight-line groove extends in a straight line along the tangent direction of a virtual circle centered on the first axis Y, and the symmetry axes of the at least two straight-line grooves are tangent to the virtual circle along the length direction. In a particular example, the symmetry axes of the at least two auxiliary upper grooves 1235 or the at least two auxiliary lower grooves 1216 as straight-line grooves are tangent to the virtual circle centered on the first axis Y along the length direction, in other words, one of the at least two auxiliary upper grooves 1235 and the at least two auxiliary lower grooves 1216 is a straight-line groove with a symmetry axis tangent to the virtual circle centered on the first axis Y along the length direction. Furthermore, the straight-line groove has two long edge groove walls and two short edge groove walls. The two long edge groove walls are provided opposite each other, and the two short edge groove walls are respectively connected to the two long edge groove walls. The two long edge groove walls are parallel to each other, and extend along the straight line. The connections between the two short side groove walls and the two long side groove walls can be arc-shaped, thereby reducing the difficulty of forming a straight-line groove. Correspondingly, a straight-line groove has a rounded rectangular shape.

Furthermore, the other of the at least two auxiliary upper grooves 1235 and the at least two auxiliary lower grooves 1216 may also be a straight-line groove. However, considering that when the at least two auxiliary upper grooves 1235 and the at least two auxiliary lower grooves 1216 are straight-line grooves, the position of the auxiliary balls 1222 is not controlled when the frame 123 is driven to rotate relative to the reflection base 121, resulting in the auxiliary balls 1222 being stuck by the auxiliary upper grooves 1235 and the auxiliary lower grooves 1216, thereby affecting the rotation of the frame 123 relative to the reflection base 121 around the first axis Y For example, during the driving process, when the auxiliary balls 1222 are located on the side closest to the rotation direction of the frame 123 in the auxiliary lower groove 1216 for accommodating the auxiliary balls 1222 and on the side farthest from the rotation direction of the frame 123 in the auxiliary upper groove 1235 or accommodating the auxiliary balls 1222, then the frame 123 is continuously driven to rotate relative to the reflection base 121. The auxiliary balls 1222 are clamped by the corresponding groove walls of the auxiliary upper groove 1235 and the auxiliary lower groove 1216, so that it is difficult for the auxiliary balls 1222 to roll or translate, thereby affecting the rotation of the frame 123. To solve this problem, it can be achieved by increasing the length of the auxiliary upper groove 1235 or the auxiliary lower groove 1216. However, increasing the length of the auxiliary upper groove 1235 or the auxiliary lower groove 1216 will occupy more space in the frame 123 or reflection substrate 1211, causing an increase in the size of the frame 123 or the reflection substrate 1211, and thus leading to an increase in the size of the reflection driving assembly 12.

Therefore, in one example of the present application, the other of the at least two auxiliary upper grooves 1235 and the at least two auxiliary lower grooves 1216 are positioning grooves for positioning the auxiliary ball 1222, which is tightly fitted and accommodated in the positioning groove. It is worth mentioning that, being tightly matched and placed in the positioning groove does not mean that there is no gap between the auxiliary ball 1222 and the positioning groove. There can still be a certain gap between the auxiliary ball 1222 and the positioning groove, so that the auxiliary ball 1222 can still roll or translate in the positioning groove while being positioned by the positioning groove. Particularly, tightly fitting accommodation refers to centered arrangement of the auxiliary ball 1222 in the positioning groove, and the minimum distance between the auxiliary ball 1222 and the side wall of the positioning groove is equal to or less than 0.1 mm. Preferably, the minimum distance is equal to or less than 0.05 mm. Correspondingly, loosely fitting accommodation refers to centered arrangement of the auxiliary ball 1222 in a straight-line groove, and the minimum distance between the auxiliary ball 1222 and the long edge groove wall is equal to or greater than 0.1 mm, preferably equal to or greater than 0.15 mm. The minimum distance between auxiliary ball 1222 and the short groove wall is at least 0.2 mm greater than the movement stroke of auxiliary ball 1222. Correspondingly, the maximum gap between the at least two auxiliary balls 1222 and the at least two auxiliary lower grooves 1216 is less than the maximum gap between the at least two auxiliary balls 1222 and the at least two auxiliary upper grooves 1235.

It should be understood that in one particular example, the at least two auxiliary lower grooves 1216 are straight-line grooves extending along the tangent direction of a virtual circle centered on the first axis Y, and the at least two auxiliary upper grooves 1235 are positioning grooves for locating the auxiliary balls 1222. The at least two auxiliary balls 1222 are loosely accommodated in the at least two auxiliary lower grooves 1216, and the at least two auxiliary balls 1222 are tightly accommodated in the at least two auxiliary upper grooves 1235. At this time, the at least the two auxiliary balls 1222 are respectively positioned through the at least two auxiliary upper grooves 1235. In another particular example, the at least two auxiliary upper grooves 1235 are straight-line grooves extending along the tangent direction of a virtual circle centered on the first axis Y, and the at least two auxiliary lower grooves 1216 are positioning grooves for positioning the auxiliary balls 1222. The at least two auxiliary balls 1222 are loosely accommodated in the at least two auxiliary upper grooves 1235, and the at least two auxiliary balls 1222 are tightly accommodated in the at least two auxiliary lower grooves 1216. At this time, the at least two auxiliary balls 1222 are respectively positioned through the at least two auxiliary lower grooves 1216. From the perspective of driving the frame 123 to rotate relative to the reflection base 121, there are no obvious advantages or disadvantages between the two particular examples. However, considering the assembly process, the straight-line groove cannot locate the balls, and during the installation process, the auxiliary balls 1222 need to be provided in the positioning groove first. Therefore, to simplify the assembly process and avoid flipping the semi-finished reflection driving assembly 12 during the assembly of the auxiliary balls 1222, it is preferable to use the at least two auxiliary lower grooves 1216 as positioning grooves for positioning the auxiliary balls 1222. Correspondingly, the gap between the at least two auxiliary balls 1222 and the at least two auxiliary lower grooves 1216 is smaller than the gap between the at least two auxiliary balls 1222 and the at least two auxiliary upper grooves 1235.

Figure 16:
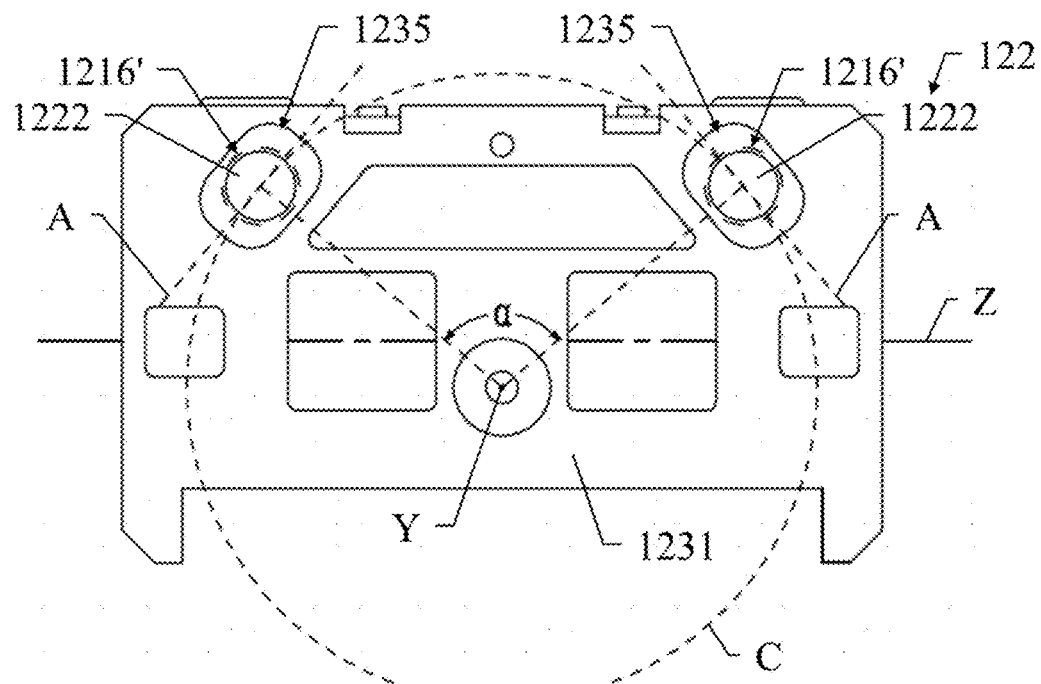
FIG. 16 is a schematic diagram of the bottom surface of the frame according to the present application.
Figure 17:
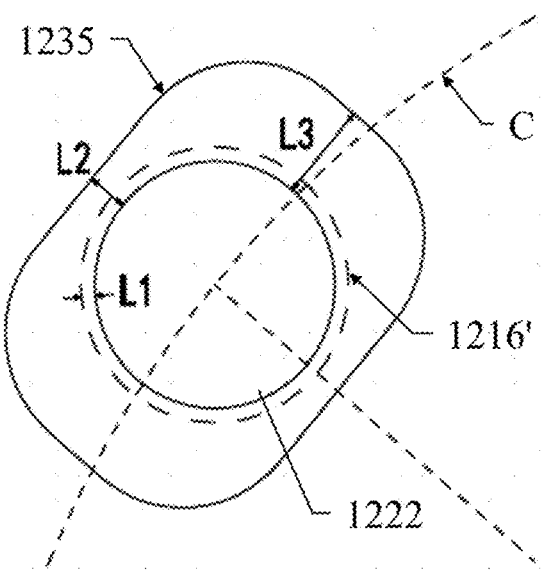
FIG. 17 is an enlarged local view of FIG. 16.

Further combining FIGS. 16 and 17, particularly 1216' is the projection of the auxiliary lower groove 1216 along the direction of the first axis Y on the bottom surface of the frame 123, C is the virtual circle centered on the first axis Y, and A is the symmetry axis of the auxiliary upper groove 1235 along the length direction. In this example, the number of the auxiliary balls 1222, the auxiliary upper grooves 1235, and the auxiliary lower grooves 1216 are all two. The first support portion 122 includes two auxiliary balls 1222, the bottom surface of the frame 123 has two auxiliary upper grooves 1235, the reflection substrate 1211 has two auxiliary lower grooves 1216, the two auxiliary upper grooves 1235 are symmetrically formed on the bottom surface of the frame 123, the two auxiliary lower grooves 1216 are symmetrically formed on the top surface of the reflection substrate 1211, and the two auxiliary upper grooves 1235 are respectively provided opposite to the two auxiliary lower grooves 1216, forming two ball movement spaces. Particularly, the two auxiliary upper grooves 1235 are straight-line grooves, and the two auxiliary lower grooves 1216 are positioning grooves. A virtual circle C is formed with the first axis Y as the center. The two auxiliary upper grooves 1235 extend along the tangent direction of the virtual circle C. The initial position of each auxiliary lower groove 1216 is respectively projected along the direction of the first axis Y on the middle area of the opposite auxiliary upper groove 1235. It should be understood that, the initial positions of the two auxiliary lower grooves 1216 refer to the positions of the two auxiliary lower grooves 1216 when the angle at which the frame 123 can rotate relative to the reflection base 121 around the first axis Y in two opposite directions is equal; accordingly, when the reflection driving assembly 12 drives the frame 123 to rotate around the first axis Y, the reflective element 11 can have a large rotation angle in both directions. In a particular example, at initial position, the center points of two auxiliary upper grooves 1235 are located on a virtual circle C centered on the first axis Y.

Particularly, both of the auxiliary upper grooves 1235 have a symmetrical axis A that is tangent to the virtual circle C centered on the first axis Y along the length direction, and the two auxiliary balls 1222 are loosely accommodated in the two auxiliary upper grooves 1235. When the auxiliary ball 1222 is centered in the auxiliary upper groove 1235, the minimum distance L2 between the auxiliary ball 1222 and the long side groove wall of the auxiliary upper groove 1235 is greater than 0.1 mm; preferably, the minimum distance L2 is greater than 0.15 mm. The minimum distance L3 between the auxiliary ball 1222 and the short side groove wall of the auxiliary upper groove 1235 is at least 0.2 mm larger than the movement stroke of the auxiliary ball 1222. The movement stroke of the auxiliary ball 1222 is related to the angle at which the frame 123 can rotate around the first axis Y and the distance between the auxiliary ball 1222 and the first axis Y. Furthermore, in one example, the angle α between the perpendicular lines from the first axis Y to the two auxiliary upper grooves 1235 is a range of 80-100°, which provides better support for the auxiliary ball 1222 during the rotation of the frame 123, and does not cause the size of the frame 123 to be too large due to the arrangement of the auxiliary upper groove 1235. In a particular example, the angle α between the perpendicular lines of the symmetry axis A along the length direction from the first axis Y to the two auxiliary upper grooves 1235 is respectively 90°.

The two auxiliary lower grooves 1216 correspond to the two auxiliary upper grooves 1235, and the two auxiliary balls 1222 are tightly matched and accommodated in the two auxiliary lower grooves 1216, respectively. When the auxiliary ball 1222 is centered in the auxiliary lower groove 1216, the minimum distance L1 between the auxiliary ball 1222 and the side wall of the auxiliary lower groove 1216 is less than 0.1 mm; preferably, the minimum distance L1 is less than 0.05 mm. Correspondingly, the maximum gap between the two auxiliary balls 1222 and the two auxiliary lower grooves 1216 is smaller than the maximum gap between the two auxiliary balls 1222 and the two auxiliary upper grooves 1235. It should be understood that, tightly fitting only indicates that when an auxiliary ball 1222 is provided between the auxiliary upper groove 1235 and the auxiliary lower groove 1216, the gap between the auxiliary ball 1222 and the auxiliary lower groove 1216 is smaller than the gap between the auxiliary ball 1222 and the auxiliary upper groove 1235, so that the auxiliary lower groove 1216 can play a positioning role, and does not mean that the auxiliary ball 1222 is stuck in the auxiliary lower groove 1216.

It should be understood that, the tightly fitting relationship between the auxiliary lower groove 1216 and the auxiliary ball 1222 determines the position of the auxiliary ball 1222 relative to the frame 123, so that when the frame 123 rotates relative to the reflection base 121, the position of the auxiliary ball 1222 will not be in an unfavorable position, which will cause the auxiliary ball 1222 to be stuck. Therefore, this implementation mode has obvious advantages. It should be understood that, more auxiliary balls 1222, as well as auxiliary upper grooves 1235 and auxiliary lower grooves 1216 for accommodating auxiliary balls 1222, can be provided, for example, all of which has the number of three, four or more, and this application is not limited to this.

Referring further to FIGS. 11 to 13B, the frame 123 includes the frame main body 1231 and the first frame side portion 1232 and the second frame side portion 1233 respectively fixed on both sides of the frame main body 1231 along the direction of the third axis Z. In one example, the first frame side portion 1232 and the second frame side portion 1233 are fixed to the frame main body 1231 by integrated molding. More particularly, the first frame side portion 1232 and the second frame side portion 1233 extend in the direction of the carrier 125 from both sides of the frame main body 1231, and the top surfaces of the first frame side portion 1232 and the second frame side portion 1233 which face the carrier 125 are respectively concave downwards to form the first shaft lower groove 12321 and the second shaft lower groove 12331. The second support portion 124 includes two shaft balls 1241, which are respectively accommodated in the first shaft lower groove 12321 and the second shaft lower groove 12331. The two shaft balls 1241 have the same height and are passed through by the third axis Z perpendicular to the first axis Y and the second axis X, so that the carrier 125 supported by the two shaft balls 1241 can rotate relative to the frame 123 around the third axis Z. The first frame side portion 1232 and the second frame side portion 1233 extend from both sides of the frame main body 1231 in the direction of the carrier 125, and adjust the height of the two shaft balls 1241 through the heights of the first shaft lower groove 12321 and the second shaft lower groove 12331 respectively, thereby controlling the height of the third axis Z passing through the two shaft balls 1241. It is worth mentioning that in one example, by adjusting the height of the first frame side portion 1232 and the second frame side portion 1233 extending upwards from the frame main body 1231 and their position in the direction of the second axis X, so that the third axis Z passes through the gravity center of the reflective element 11 or is close to the gravity center of the reflective element 11, thereby maintaining the stability of the reflective element 11 while rotating around the third axis Z.

Figure 18:
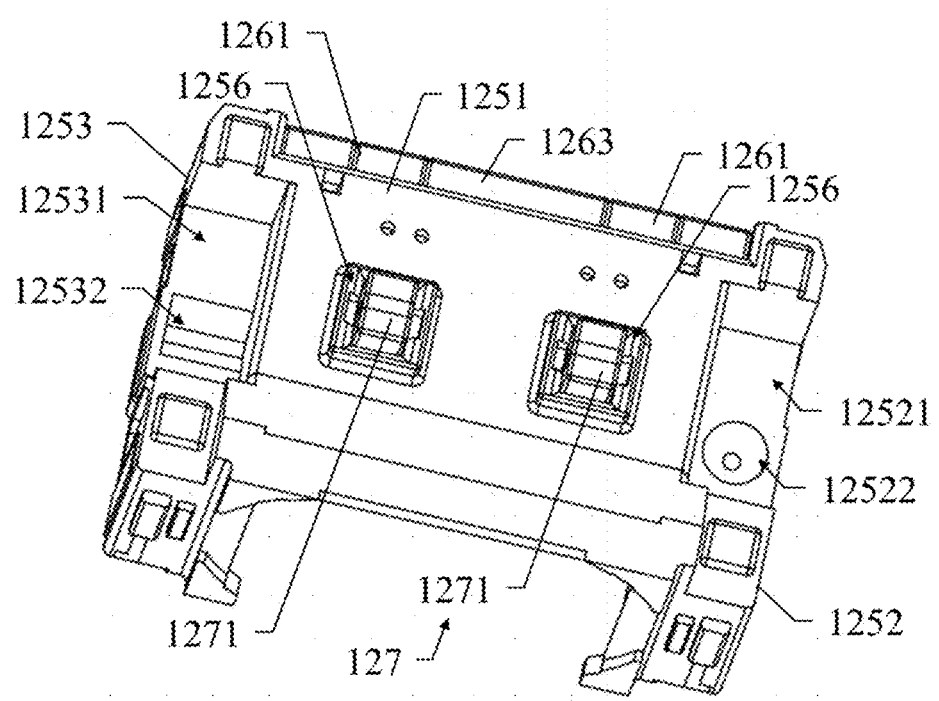
FIG. 18 is a three-dimensional schematic diagram of the carrier according to the present application.

In order to respectively accommodate the protruding first frame side portion 1232 and second frame side portion 1233, as shown in FIG. 18, the outer sides of the first carrier side portion 1252 and the second carrier side portion 1253 (i.e. the side away from the reflective element 11), the first carrier side recess 12521 and the second carrier side recess 12531 are concavely formed respectively, so that the first frame side portion 1232 can extend into the first carrier side recess 12521 of the first carrier side portion 1252, and the second frame side portion 1233 can extend into the second carrier side recess 12531 of the second carrier side portion 1253. Furthermore, the position of the first carrier side portion 1252 which faces the first shaft lower groove 12321 has a corresponding first shaft upper groove 12522, and the position of the second carrier side portion 1253 which faces the second shaft lower groove 12331 has a corresponding second shaft upper groove 12532. The first shaft upper groove 12522 and the first shaft lower groove 12321 form a ball motion space, and the second shaft upper groove 12532 and the second shaft lower groove 12331 also form a ball motion space. The two shaft balls 1241 are respectively provided between the first shaft upper groove 12522 and the first shaft lower groove 12321, as well as between the second shaft upper groove 12532 and the second shaft groove 12331. In this way, the two shaft balls 1241 are respectively provided between the first carrier side portion 1252 and the first frame side portion 1232, as well as between the second carrier side portion 1253 and the second frame side portion 1233. It should be understood that, the two shaft balls 1241 can be rolled between the carrier 125 and the frame 123, and the two shaft balls 1241 can also be fixed onto the carrier 125 or the frame 123.

Particularly in one example, the first shaft lower groove 12321 and the second shaft lower groove 12331 respectively maintain at least three point contacts or line contacts with the two shaft balls 1241, so that the two shaft balls 1241 are determined at the first shaft lower groove 12321 and the second shaft lower groove 12331, respectively. One of the first shaft upper groove 12522 and the second shaft upper groove 12532 maintains at least three points or line contact with one of the shaft balls 1241, while the other of the first shaft upper groove 12522 and the second shaft upper groove 12532 only maintains two points contact with the other shaft ball 1241. For example, the first shaft upper groove 12522 maintains at least three points contact or line contact with one of the shaft balls 1241, while the second shaft upper groove 12532 only maintains two points contact with the other shaft ball 1241. In this way, carrier 125 can be positioned on frame 123 through one of the shaft balls 1241, while the other shaft ball 1241 does not play a positioning role, so that when the carrier 125 is supported on the frame 123 through the two shaft balls 1241, it will not be difficult to respectively arrange the two shaft balls 1241 between the first shaft upper groove 12522 and the first shaft lower groove 12321, as well as between the second shaft upper groove 12532 and the second shaft lower groove 12331 due to manufacturing tolerances of the components. In a particular example, line contact refers to circular line contact.

Continuing with reference to FIGS. 13A and 18, the first shaft lower groove 12321, the second shaft lower groove 12331, and the first shaft upper groove 12522 are all frustum shaped grooves. The second shaft upper groove 12532 is a groove that extends along the direction of the third axis Z and has a trapezoidal cross-section, so that one of the shaft roller balls 1241 maintains line contact with the first shaft lower groove 12321 and the first shaft upper groove 12522 respectively, while the other shaft roller ball 1241 maintains line contact with the second shaft lower groove 12331 and maintains two points contact with the second shaft upper groove 12532.

Correspondingly, in the present application, the two shaft balls 1241 and the at least two auxiliary balls 1222 are respectively provided at different heights, but the two shaft balls 1241 and the at least two auxiliary balls 1222 can be provided in the reflection driving assembly 12 in the height direction (i.e., the direction of the first axis Y), which makes the assembly of the reflection driving assembly 12 simple, and it only requires to stack various components along the height direction.

In one example of the present application, as shown in FIG. 12A, the surface of the carrier 125 is further fixed with the carrier buffer 1257. Particularly, the carrier buffer 1257 is fixed to the surface of the carrier 125 through a process such as bonding with glue or secondary injection molding, thereby providing a buffering effect when the carrier 125 collides with the frame 123 or the reflection base 121. The carrier buffer 1257 can be made of flexible materials such as silicone.

It is worth mentioning that, as mentioned above, considering that the reflection base 121 has an opening facing the direction of the light exiting from the reflective module 10, in order to prevent the carrier 125 from exceeding the rotation stroke or falling off when rotating around the third axis Z, the frame 123 further includes two rotation stop members 1237. The two rotation stop members 1237 are provided at both sides of the frame main body 1231 along the direction of the third axis Z, and respectively extend from both sides of the frame main body 1231 along the direction of the second axis X to the bottom of the first carrier side 1252 and the second carrier side 1253, so that the projection of the two rotation stop members 1237 in the direction of the first axis Y falls on the first carrier side 1252 and the second carrier side 1253, respectively. Therefore, when the rotation angle of the carrier 125 exceeds the designed angle, it can be stopped by the two rotation stop members 1237 and stop rotating.

Furthermore, as shown in FIGS. 14, 18, and 20, the reflection driving assembly 12 further includes the reflective magnetic attraction portion 127. The reflective magnetic attraction portion 127 includes two first reflection magnetic components 1271 and two second reflection magnetic components 1272. The two first reflection magnetic components 1271 are respectively fixed to the bottom surface of the carrier 125, and the two second reflection magnetic components 1272 are respectively fixed to the top of the reflection substrate 1211 of the reflection base 121. The two first reflection magnetic components 1271 and the two second reflection magnetic components 1272 are magnetically attracted to each other, so that the carrier 125 is magnetically attracted to the top surface of the reflection substrate 1211 with the frame 123 sandwiched between them. Correspondingly, the carrier 125 is supported on the reflection base 121 through the magnetic attraction force of the reflective magnetic attraction portion 127, with the frame 123 sandwiched between them. Particularly, one of the first reflection magnetic component 1271 and the second reflection magnetic component 1272 is implemented as a magnet, and the other of the first reflection magnetic component 1271 and the second reflection magnetic component 1272 is made of a material that can be attracted by the magnet. For example, the other of the first reflection magnetic component 1271 and the second reflection magnetic component 1272 can be implemented as a magnet or a magnet yoke.

In one example of the present application, the two first reflection magnetic components 1271 are implemented as magnetic attraction magnets, and the two second reflection magnetic components 1272 are implemented as magnetic attraction yokes. Due to the fact that the two first reflection magnetic components 1271 implemented as magnetic attraction magnets are further away from the edge of the reflective module 10 compared to the two second reflection magnetic components 1272 implemented as magnetic attraction yokes, the magnetic interference generated by the reflective magnetic attraction portion 127 can be reduced. Correspondingly, in order to further reduce the magnetic interference problem, the two first reflection magnetic components 1271 are implemented as magnetic attraction multipole magnets. It should be understood that, the external expansion magnetic induction lines of multipole magnets are closer than those of monopole magnets, thereby facilitating to reduce magnetic leakage.

Figure 19:
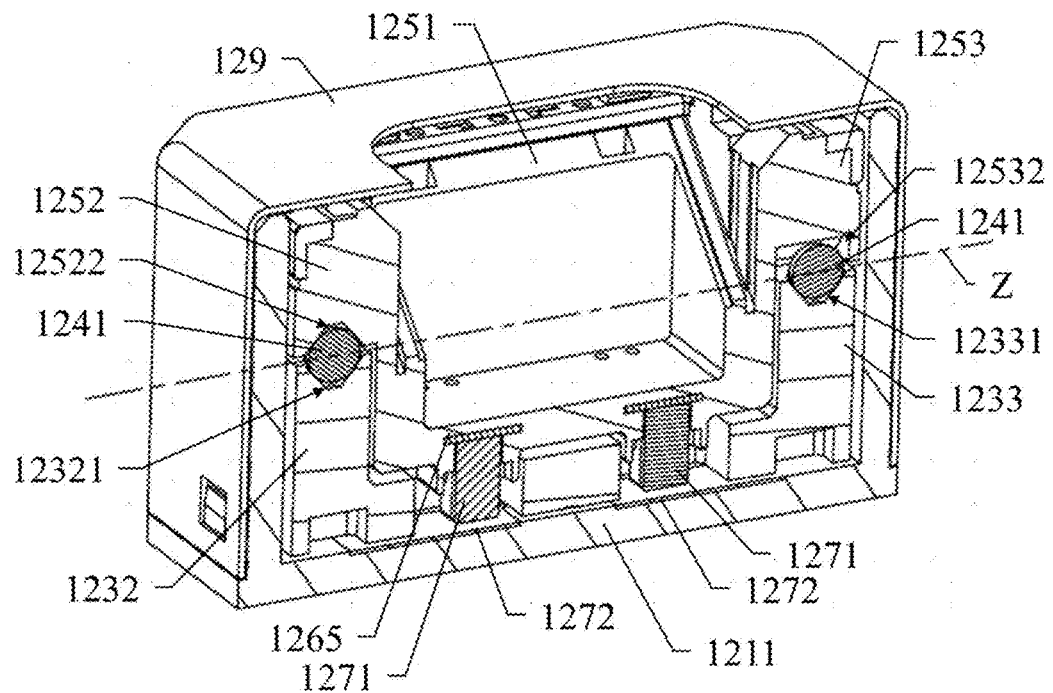
FIG. 19 is a cross-sectional schematic diagram of a reflection driving assembly according to the present application.

More particularly, the two first reflection magnetic components 1271 protrude from the bottom surface of the carrier 125, and the two second reflection magnetic components 1272 are exposed from the top surface of the reflection base 121, thereby reducing the distance between the two first reflection magnetic components 1271 and the two second reflection magnetic components 1272, and increasing the magnetic attraction force between the first reflection magnetic component 1271 and the second reflection magnetic component 1272. Furthermore, the positions of the frame 123 which face the two first reflection magnetic components 1271 and the two second reflection magnetic components 1272 respectively are concave inwardly to provide avoidance spaces. It should be understood that, two through grooves can also respectively and directly be formed at the positions of the frame 123 which face the two first reflection magnetic components 1271 and the two second reflection magnetic components 1272, so as to provide avoidance space. For example, as shown in FIG. 19, the two through grooves are respectively and directly formed at the positions of the frame 123 which face the two first reflection magnetic components 1271 and the two second reflection magnetic components 1272, wherein the two first reflection magnetic components 1271 respectively pass through the two through grooves directly, so that the distance between the first and second magnetic components is not limited by the arrangement of the frame 123.

In one example, the bottom surface of carrier 125 is concave inwardly to form two carrier magnetic attraction grooves 1256, and two first reflection magnetic components 1271 are fixed to the bottom surface of carrier 125 by being installed in each of the two carrier magnetic attraction grooves 1256; two second reflection magnetic components 1272 are respectively fixed on the top surface of the reflection substrate 1211 of the reflection base 121 by bonding or insert injection molding. To maintain sufficient gap between the first reflection magnetic component 1271 and the second reflection magnetic component 1272 while generating sufficient magnetic attraction, the area of the second reflection magnetic component 1272 can also be increased. Correspondingly, in a particular example, the projection of the first reflection magnetic component 1271 in the direction of the first axis Y falls on the second reflection magnetic component 1272, i.e., the area of the projection of the first reflection magnetic component 1271 in the direction of the first axis Y is smaller than the area of the projection of the second reflection magnetic component 1272 in the direction of the first axis Y It is worth mentioning that, in order to facilitate the installation of the two second reflection magnetic components 1272, a magnetic attraction connection portion 1273 can also be provided between the two second reflection magnetic components 1272. The magnetic attraction connection portion 1273 has an opening in the middle to avoid the shaft support member 1221, and the magnetic attraction connection portion 1273 protrudes downwards to be fixed in the reflection base 121 by insert injection molding.

Herein, in order to facilitate the installation of the first reflection magnetic component 1271, the two first reflection magnetic components 1271 are also magnetically attracted by the reflection magnetic conductive plate 1265 embedded in the carrier 125. In one example, the reflection magnetic conductive plate 1265 is exposed from two carrier magnetic attraction grooves 1256, and the two reflection magnetic components are respectively provided in two carrier magnetic attraction grooves 1256, and attracted each other with the reflection magnetic conductive plate 1265.

Furthermore, FIG. 20 shows a schematic diagram of the reflection base 121 viewed from above in the direction of the first axis Y, wherein the two shaft balls 1241 and the two first reflection magnetic components 1271 are projected onto the reflection substrate 1211 of the reflection base 121 in the direction of the first axis Y It should be understood that, when the reflective magnetic attraction portion 127 makes the carrier 125 magnetically attracted onto the reflection base 121 through magnetic attraction with the frame 123 sandwiched between them, the reflective magnetic attraction portion 127 also applies magnetic attraction to the first support portion 122 and the second support portion 124. But if the magnetic attraction of the reflective magnetic attraction portion 127 does not directly act on the third axis Z of the two rotating axis balls 1241 passing through the second support portion 124, the magnetic attraction will affect the rotation of the carrier 125 relative to the frame 123 around the third axis Z. Particularly, when the direction of the magnetic attraction of the reflective magnetic attraction portion 127 does not intersect with the third axis Z, the magnetic attraction of the reflective magnetic attraction portion 127 does not directly act on the third axis Z, resulting in significant recovery resistance that hinders the rotation of the carrier 125 around the third axis Z, so that it is necessary to increase the thrust of the reflection driving assembly 12, thereby causing the rotation of the carrier 125 relative to the frame 123 around the third axis Z to tilt in one direction. In other words, in order to ensure the normal and stable rotation of the carrier 125 relative to the frame 123, it is necessary to control the position relationship of the acting direction of the magnetic attraction of the reflective magnetic attraction portion 127 and the third axis Z. Any deviation may cause uneven rotation or increase unnecessary thrust demand, thereby affecting the stability and efficiency of the entire system. It is worth mentioning that, the acting direction of the magnetic attraction of the reflective magnetic attraction portion 127 refers to the acting direction of the combined force of all magnetic attraction forces in the reflective magnetic attraction portion 127. For example, when two magnetic attraction component forces are generated between the two first and second reflection magnetic components 1271 and 1272 of the reflective magnetic attraction portion 127, the direction of the combined force of the two magnetic attraction component forces is the acting direction of the magnetic attraction action of the reflective magnetic attraction portion 127. Alternatively, when the reflective magnetic attraction portion 127 only generates one magnetic attraction force, the acting direction of the magnetic attraction force is the acting direction of the magnetic attraction force of the reflective magnetic attraction portion 127.

However, when the magnetic attraction force of the reflective magnetic attraction portion 127 directly acts on the shaft support member 1221 of the first support portion 122, it will increase wear on the shaft support member 1221, thereby damaging and affecting the rotation accuracy of the frame 123 relative to the reflection base 121.

In order to solve the above problem, in one example, the first axis Y around which the frame 123 rotates relative to the reflection base 121 does not intersect with the third axis Z around which the carrier 125 rotates relative to the frame 123, and there is a certain distance between the first axis Y and the third axis Z. Correspondingly, when viewing in the direction of the first axis Y, the first axis Y is not located on the third axis Z, and the third axis Z is located between the shaft support member 1221 and the at least two auxiliary balls 1222. In one particular example, the distance between the shaft support member 1221 and the third axis Z is less than the distance between the at least two auxiliary balls 1222 and the third axis Z. Furthermore, when viewing in the direction of the first axis Y, acting direction of the magnetic attraction force of the reflective magnetic attraction portion 127 intersects with the third axis Z, the magnetic attraction force of the reflective magnetic attraction portion 127 directly acts on the third axis Z, and the reflective magnetic attraction portion 127 is symmetrical about the third axis Z. In a particular example, when viewing along the first axis Y direction, the two first reflection magnetic components 1271 are symmetrically provided about the third axis Z.

It is worth mentioning that, since the rotating magnets driving the carrier 125 to rotate around the first axis Y are all provided on the back of the carrier 125 which is away from the lens module 20; accordingly, for the driving carrier 125 to rotate around the first axis Y, the farther the first axis Y is away from the reflection driving portion 126, the greater the torque of the driving force provided by the reflection driving portion 126 for rotating around the first axis Y is. Therefore, in one example of the present application, the vertical distance L4 between the first axis Y and the center of the first rotating magnet 1261 of the reflection driving portion 126 is equal to or greater than 2 mm, so that the driving force of the reflection driving portion 126 for driving the carrier 125 to rotate around the first axis Y has a sufficient torque, thereby driving the carrier 125, the frame 123, and other components fixed on the above two to rotate. Furthermore, considering the limitation of mobile electronic devices on the working current of the rotating coil, the larger the working current of the rotating coil is, the greater the power consumption for the reflection driving assembly 12 is. Therefore, it can be considered to increase the vertical distance L4 between the first axis Y and the center of the first rotating magnet 1261, thereby reducing the demand for the maximum working current of the first rotating coil 1262. For example, the maximum working current of the first rotating coil 1262 can be designed below 100 mA. In an example, the vertical distance L4 between the first axis Y and the center of the first rotating magnet 1261 is equal to or greater than 3.5 mm.

However, when the distance between the first axis Y and the third axis Z is too large, it will result in insufficient utilization of the reflection surface of the reflective element 11 fixed on the carrier 125, which is not conductive to the overall design of the reflective module 10. Therefore, further considering the design issue of the spacing between the third axis Z and the first axis Y, in combination with the position of the first axis Y, the vertical distance L4 between the first axis Y and the center of the first rotating magnet 1261 may be 2-5.5 mm, and preferably 3.5-5.5 mm (both including the two end values). Furthermore, the first axis Y is located on the side of the third axis Z which is away from the reflection driving portion 126, accordingly under approximate conditions, the driving force provided by the reflection driving portion 126 for rotating around the first axis Y may have a large torque, thereby reducing the requirement for the working current of the first rotating coil 1262, and thus reducing the power consumption of the reflective module 10.

It is worth mentioning that, during the usage of the camera module, it is necessary to consider that the gravity of the carrier 125 and the active part composed of the components fixed to the carrier 125 will hinder the carrier 125 from being supported on the reflection base 121 through the magnetic attraction force of the reflective magnetic attraction portion 127 with the frame 123 sandwiched between them, during the attitude change process of the reflective module 10; in severe cases, this problem may cause the carrier 125 to fall off. To reduce the likelihood of this situation, the height of the gravity center of the active part can be lowered to bring the gravity center closer to the reflection substrate 1211, thereby reducing the torque generated by the weight of the active part. Correspondingly, as shown in FIGS. 12B, and 14-15, in one example of the present application, the height of the top surface of the first rotating magnet 1261 is lower than the height of the top surface of the second rotating magnet 1263, thereby reducing the height of the gravity center of the active part. Furthermore, in a particular example, the size of the first rotating magnet 1261 in the direction of the first axis Y is also smaller than the size of the second rotating magnet 1263 in the direction of the first axis Y.

Furthermore, as shown in FIG. 10, in one example of the present application, the first axis Y and the third axis Z are not in the same plane, and the first axis Y and the third axis Z are perpendicular to each other but not intersecting. The second axis X and the third axis Z are not in the same plane, and the second axis X and the third axis Z are perpendicular to each other but do not intersect. The first axis Y and the second axis X are located in the same plane, and the first axis Y and the second axis X are perpendicular to and intersect with each other. In other words, the first axis Y and the third axis Z do not intersect with each other, and the first axis Y and the third axis Z are mutually perpendicular in space. The second axis X and the third axis Z do not intersect with each other, and the second axis X and the third axis Z are mutually perpendicular in space. The first axis Y and the second axis X intersect with and are perpendicular to each other. Particularly, the intersection point of the first axis Y and the second axis X is not located on the light reflection surface 18 of the reflective element 11, while the intersection point of the first axis Y and the second axis X is located above the light reflection surface 18 of the reflective element 11. It should be understood that, this implementation mode reduces the design difficulty of the reflection driving assembly 12, and the design of rotation axis of the reflection driving assembly 12 does not need to be limited to the optical axis position of the lens module 20. Of course, in another example of this application, the intersection point of the first axis Y and the second axis X can also be located on the light reflecting surface 18 of the reflective element 11.

It should be understood that in another example of the present application, the first axis Y and the second axis X may also not intersect with each other, but the first axis Y and the second axis X are mutually perpendicular in space, i.e., any two axes of the first axis Y, the second axis X and the third axis Z do not intersect with each other, but they are mutually perpendicular in space, and any two axes of the first axis Y, the second axis X and the third axis Z do not extend in the same plane.

Figure 11:
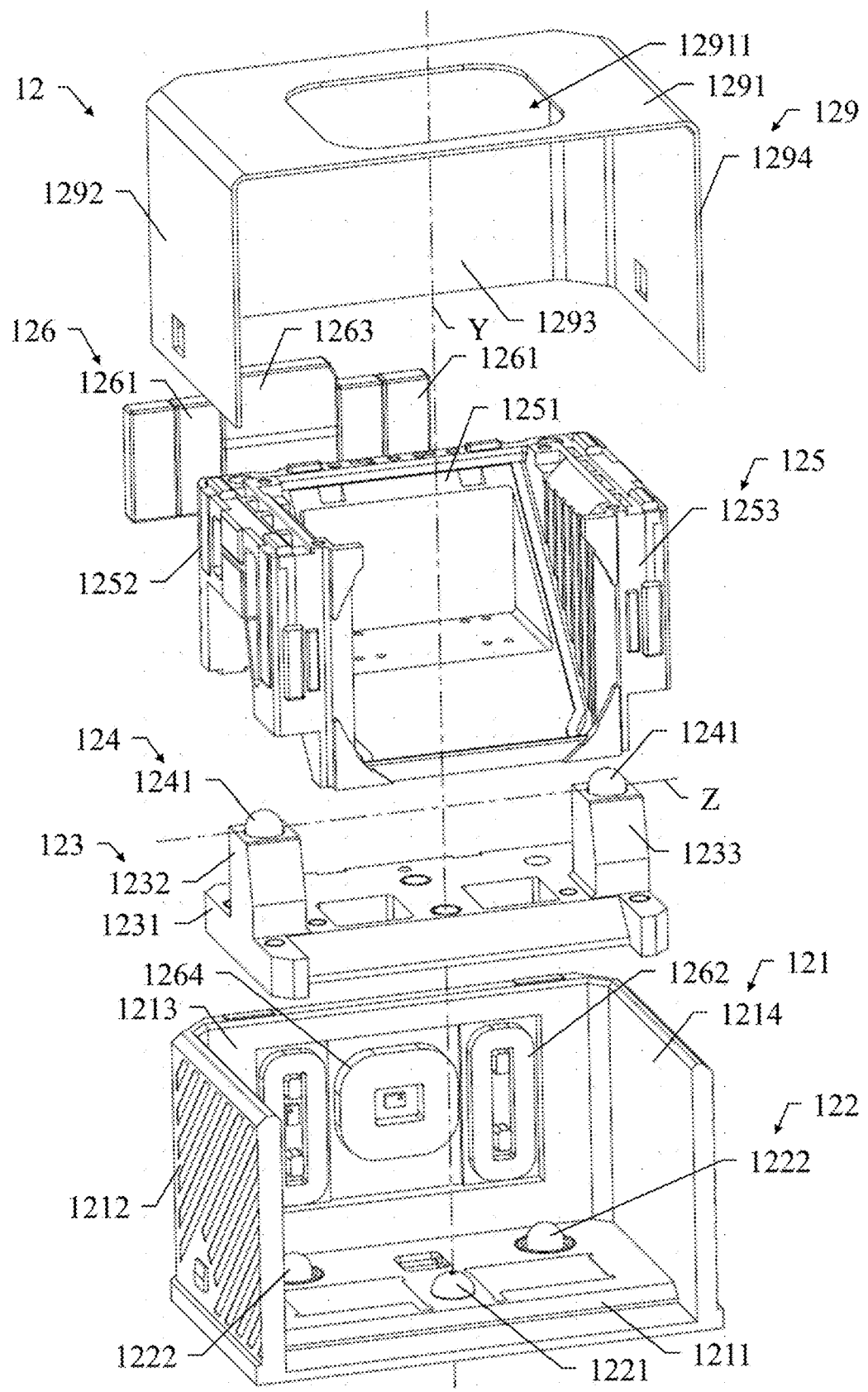
FIG. 11 is an explosion schematic diagram of the reflection driving assembly according to the present application.

Furthermore, as shown in FIG. 11, the reflection driving assembly 12 further includes the reflection cover body 129, which is fixed to the reflection base 121 and forms a accommodating space to accommodate other components of the reflection driving assembly 12. Particularly, the reflection cover body 129 includes: a top portion 1291 of the reflection cover body; and a first reflection cover body side portion 1292, a second reflection cover body side portion 1293 and a third reflection cover body side portion 1294 which are fixed to the top portion 1291 of the reflection cover body. Particularly, the top portion of the reflection cover body 1291 has an incident window 12911, the first reflection cover body side portion 1292 and the third reflection cover body side portion 1294 are provided opposite to each other on both sides of the top of the reflection cover body, the second reflection cover body side portion 1293 is connected to the first reflection cover body side portion 1292 and the third reflection cover body side portion 1294, and the second reflection cover body side portion 1293 is located on the side away from the lens module 20. In this way, light can enter the reflective module 10 through the incident window 12911 at the top of the reflection cover body 1291, and leave the reflective module 10 from the side where no side portion of the reflection cover body 129 is provided.

Figure 21:
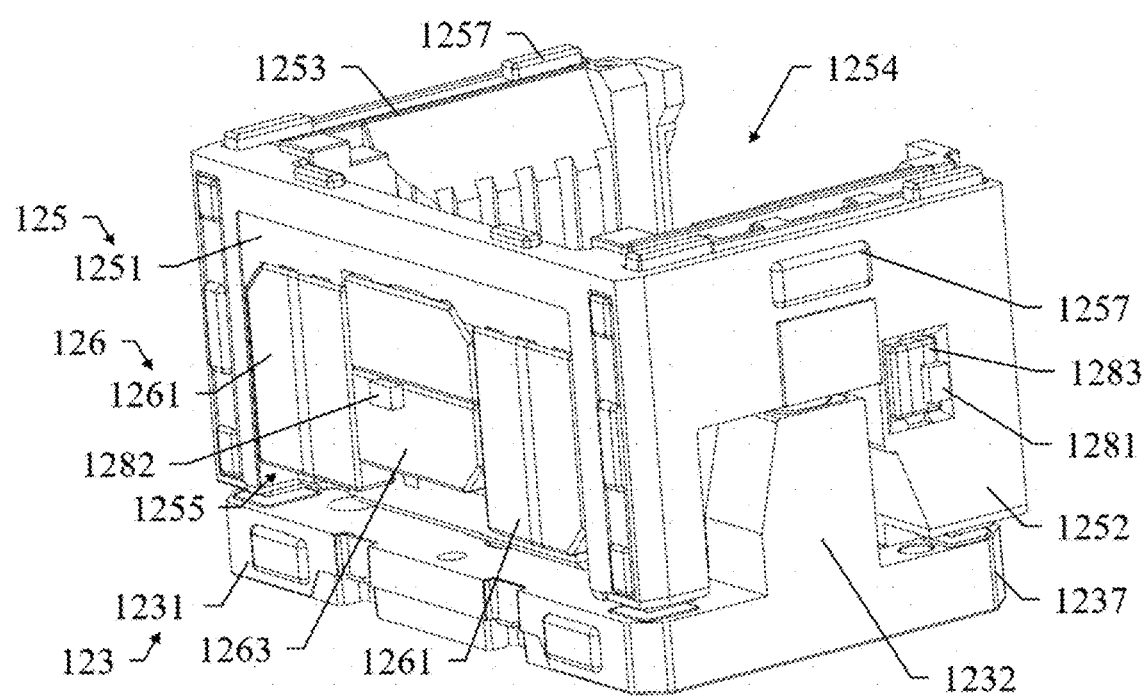
FIG. 21 is a three-dimensional schematic diagram of the carrier and the frame assembled together according to another variant example of the present application.

In another example of the present application, as shown in FIG. 21, the second rotation sensing element 1282 is still provided in the middle of the second rotating coil 1264 and faces the second rotating magnet 1263. The rotating-position sensing portion 128 also includes a first rotation sensing magnet 1283 fixed to the carrier 125. The first rotation sensing element 1281 is provided opposite to the first rotation sensing magnet 1283, and obtains the attitude change information of the carrier 125 rotating around the first axis Y by sensing the magnetic field information change of the first rotation sensing magnet 1283. Particularly, the first rotation sensing magnet 1283 is fixed in a groove on the first carrier side portion 1252 of the carrier 125; the first rotation sensing element 1281 is fixed on the first reflection base side portion 1212, and the second rotation sensing element 1282 is fixed on the second reflection base side portion 1213.

In this example, the first rotation sensing element 1281 and the first rotation sensing magnet 1283 are located on a plane passing through the third axis Z and perpendicular to the first axis Y, thereby reducing the magnetic crosstalk problem encountered by the first rotation sensing element 1281 during the sensing process. Particularly, the first rotation sensing element 1281 is used to sense the rotation of the carrier 125 around the first axis Y, and the carrier 125 also rotates relative to the frame 123 around the third axis Z. The first rotation sensing element 1281 and the first rotation sensing magnet 1283 are provided on a plane passing through the third axis Z and perpendicular to the first axis Y, thereby reducing the impact of the rotation of the carrier 125 around the third axis Z on the sensing function of the first rotation sensing element 1281. Furthermore, when viewing in the direction of the third axis Z, the distance between the first rotation sensing element 1281 and the first axis Y is equal to or less than 3.5 mm, so as to ensure the symmetry of the sensing by the first rotation sensing element 1281. Particularly, the smaller the distance between the first rotation sensing element 1281 and the first axis Y is, the better the sensing symmetry of the first rotation sensing element 1281 is. When viewing in the direction of the third axis Z, due to the fact that the second support portion 124 is provided near the first axis Y, it is difficult for the first rotation sensing magnet 1283 to be provided near the first axis Y Therefore, when viewing in the direction of the third axis Z, the distance between the first rotation sensing element 1281 and the first axis Y may be 0.5-3.5 mm (including the two end values). More particularly, since the third axis Z is located between the first axis Y and the reflection driving portion 126, the first rotation sensing element 1281 and the first rotation sensing magnet 1283 are provided on the side of the first axis Y which is away from the third axis Z; that is to say, the first rotation sensing element 1281 and the first rotation sensing magnet 1283 are provided on the side of the first axis Y which is away from the second support portion 124. In this way, when viewing in the direction of the third axis Z, the distance between the first rotation sensing element 1281 and the first axis Y can be provided closer, and the distance between the first rotation sensing element 1281 and the reflection driving portion 126 may be provided farther, thereby further reducing the interference of the reflection driving portion 126 on the first rotation sensing element 1281.

In summary, the camera module and the reflection driving assembly 12 based on the examples of the present application are illustrated, wherein the reflection driving assembly 12 drives the reflective element 11 to rotate through a reasonable structural arrangement, thereby achieving optical anti-shake or camera angle adjustment of the camera module. Particularly, the reflection driving assembly 12 according to the present application can drive the reflective element 11 to rotate around the first axis Y at an angle of ±2.2°, and can drive the reflective element 11 to rotate around the third axis Z at an angle of ±1.2°. The symbol ± indicates that the reflective element 11 can rotate around the rotation axis (first axis Y or third axis Z) in two opposite directions clockwise or counterclockwise based on its initial position.

The basic principles, main features, and advantages of the present application are described. A person skilled in the art should understand that, this application is not limited by the above mentioned examples, and the above mentioned examples and the principles of this application are described in the specification. Without departing from the spirit and scope of this application, there may be various changes and modifications in this application, all of which fall within the protection scope of the application. The protection scope of this application is defined by the attached claims and their equivalents.

The invention claimed is:

1. A reflective module comprising:
   a reflective element, which reflects the light rays propagating in a direction of a first axis to a direction of a second axis intersecting with the first axis at a certain angle; and
   a reflection driving assembly, which includes a reflection base, a frame supporting the reflective element and capable of rotating around the first axis, and a shaft support member and at least two auxiliary balls which are provided between the reflection base and the frame;
     wherein the shaft support member is passed through by the first axis and fixed to the reflection base or the frame;
     the at least two auxiliary balls are provided between at least two auxiliary upper grooves of the frame and at least two auxiliary lower grooves of the reflection base, and the at least two auxiliary upper grooves and at least two auxiliary lower grooves are straight-line grooves extending along the tangent direction of a virtual circle centered on the first axis; and
     the at least two auxiliary balls are tightly fitted and accommodated in one of the at least two auxiliary upper grooves of the frame and at least two auxiliary lower grooves of the reflection base as positioning grooves, and are loosely fitted and accommodated in the other of the at least two auxiliary upper grooves of the frame and at least two auxiliary lower grooves of the reflection base.

2. The reflective module according to claim 1, wherein symmetry axes along a length direction of the at least two straight-line grooves are tangent to the virtual circle.

3. The reflective module according to claim 1, wherein the at least two auxiliary lower grooves are the positioning grooves, and a maximum gap between the at least two auxiliary balls and the at least two auxiliary lower grooves is less than a maximum gap between the at least two auxiliary balls and the at least two auxiliary upper grooves.

4. The reflective module according to claim 3, wherein an initial position of each auxiliary lower groove is projected in the direction of the first axis onto a middle area of the opposite auxiliary upper groove.

5. The reflective module according to claim 1, wherein the shaft support member is fixed to a reflection substrate of the reflection base, and the shaft support member protrudes from a top surface of the reflection substrate which faces the frame, and a shaft positioning groove is located on a bottom surface of the frame which faces the reflection substrate, and the shaft support member is accommodated in the shaft positioning groove and maintains contact with the shaft positioning groove.

6. The reflective module according to claim 1, wherein the reflection driving assembly further comprises a carrier and a second support portion provided between the carrier and the frame, and the reflective element is fixed to the carrier.

7. The reflective module according to claim 6, wherein the second support portion comprises two shaft balls, and the two shaft balls have same height and are passed through by a third axis perpendicular to the first axis and the second axis, and the carrier rotates relative to the frame around the third axis.

8. The reflective module according to claim 7, wherein the reflection driving assembly further comprises a reflective magnetic attraction portion, and the carrier is supported on the reflection base through the magnetic attraction force of the reflective magnetic attraction portion with the frame sandwiched between them.

9. The reflective module according to claim 8, wherein viewing in the direction of the first axis, an acting direction of the magnetic attraction force of the reflective magnetic attraction portion intersects with the third axis.

10. The reflective module according to claim 9, wherein the first axis and the third axis do not intersect, and the distance between the shaft support member and the third axis is less than the distance between the at least two auxiliary balls and the third axis.

11. The reflective module according to claim 6, wherein the reflection driving assembly further comprises a reflection driving portion for driving the rotation of the reflective element, and the reflection driving portion comprises at least two rotating magnets fixed on the carrier and at least two rotating coils fixed on the reflection base, and the at least two rotating magnets are provided opposite to the at least two rotating coils.

12. The reflective module according to claim 11, wherein the reflection driving assembly further comprises a rotating-position sensing portion, and the rotating-position sensing portion comprises a first rotation sensing element and a second rotation sensing element, and the rotating-position sensing portion respectively obtains the magnetic field change information of the reflective magnetic attraction portion of the reflection driving assembly and the magnetic field change information of the at least two rotating magnets through the first rotation sensing element and the second rotation sensing element, thereby obtaining the attitude change information of reflective element.

13. A camera module comprising:
   a reflective module according to claim 1;
   a lens module, which is maintained on a light reflection path of the reflective module; and
   an imaging module, which receives the light emitted by the lens module for imaging.

* * * * *